US011507622B2

(12) United States Patent
Grebenisan et al.

(10) Patent No.: US 11,507,622 B2
(45) Date of Patent: Nov. 22, 2022

(54) SYSTEM AND METHOD FOR AUTOMATICALLY MANAGING STORAGE RESOURCES OF A BIG DATA PLATFORM

(71) Applicant: THE TORONTO-DOMINION BANK, Toronto (CA)

(72) Inventors: Dan Grebenisan, Whitby (CA); Yue Ma, Mississauga (CA); Peter Sykora, Aurora (CA); Gordon Manway Lam, Richmond Hill (CA); Sarvjot Kaur Kang, Toronto (CA); Sai Macherla, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 162 days.

(21) Appl. No.: 16/829,713

(22) Filed: Mar. 25, 2020

(65) Prior Publication Data
US 2021/0303631 A1   Sep. 30, 2021

(51) Int. Cl.
| G06F 7/00 | (2006.01) |
| G06F 16/901 | (2019.01) |
| G06F 16/906 | (2019.01) |
| G06N 20/00 | (2019.01) |
| G06K 9/62 | (2022.01) |
| G06F 16/182 | (2019.01) |

(52) U.S. Cl.
CPC ........ *G06F 16/9017* (2019.01); *G06F 16/182* (2019.01); *G06F 16/906* (2019.01); *G06F 16/9027* (2019.01); *G06K 9/6256* (2013.01); *G06N 20/00* (2019.01)

(58) Field of Classification Search
CPC .. G06F 16/906; G06F 16/9027; G06F 16/182; G06N 20/00; G06K 9/6256
USPC ....... 707/665, 736, 737, 741, 652, 654, 812, 707/813
See application file for complete search history.

(56) References Cited

U.S. PATENT DOCUMENTS

| 5,239,647 A | 8/1993 | Anglin et al. |
| 5,649,102 A | 7/1997 | Yamauchi et al. |
| 5,787,437 A | 7/1998 | Potterveld et al. |

(Continued)

FOREIGN PATENT DOCUMENTS

| CN | 103428232 A | 12/2013 |
| CN | 103812939 A | 5/2014 |

(Continued)

*Primary Examiner* — Md I Uddin

(57) ABSTRACT

There is provided a computer-implemented method for automatically managing storage resources of a distributed file system comprising: obtaining actual past storage usage data of a first directory from a plurality of directories of the distributed file system to a current time; detecting, a space quota limit for the first directory and associated with a pre-defined expected future time; determining from the actual past storage usage data, projected storage usage data of the first directory over a future time period; obtaining an aggregated correction coefficient providing an indication of aggregated projected storage usage needs of remaining other directories relative to the first directory; in response to determining an expected value of the projected storage usage data at the expected future time is inconsistent with the space quota limit, adjusting the space quota limit to a new quota limit based on the expected value weighted by the aggregated correction coefficient.

28 Claims, 8 Drawing Sheets

(56) References Cited

U.S. PATENT DOCUMENTS

| | | | |
|---|---|---|---|
| 6,327,594 | B1 | 12/2001 | Van Huben et al. |
| 6,697,846 | B1 | 2/2004 | Soltis |
| 6,735,593 | B1 | 5/2004 | Williams |
| 7,010,532 | B1 | 3/2006 | Stakutis et al. |
| 7,136,801 | B2 | 11/2006 | Leonhardt et al. |
| 7,246,140 | B2 | 7/2007 | Therrien et al. |
| 7,644,087 | B2 | 1/2010 | Barkai et al. |
| 8,667,001 | B2 | 3/2014 | Dinker et al. |
| 8,892,780 | B2 | 11/2014 | Lee et al. |
| 9,098,562 | B2 | 8/2015 | Bettger et al. |
| 9,253,176 | B2 | 2/2016 | Ford et al. |
| 9,590,992 | B2 | 3/2017 | Litoiu et al. |
| 2001/0044879 | A1 | 11/2001 | Moulton et al. |
| 2014/0040580 | A1 | 2/2014 | Kripalani |
| 2014/0229514 | A1 | 8/2014 | Shazly |
| 2015/0003814 | A1* | 1/2015 | Miller ................ H04N 21/4334 386/297 |
| 2021/0011830 | A1* | 1/2021 | Khokhar ............ G06F 9/45533 |

FOREIGN PATENT DOCUMENTS

| | | |
|---|---|---|
| CN | 103873546 B | 11/2017 |
| EP | 2724268 B1 | 1/2019 |
| WO | 2002065329 A1 | 8/2002 |
| WO | 2013067079 A1 | 5/2013 |
| WO | 2013070873 A1 | 5/2013 |

\* cited by examiner

SYSTEM AND METHOD FOR AUTOMATICALLY MANAGING STORAGE RESOURCES OF A BIG DATA PLATFORM

FIELD OF INVENTION

The present disclosure generally relates to computer-implemented systems and methods for automatically managing electronic storage resources of a big data platform, and in particular, management of shared data storage of distributed file systems including big data platforms.

BACKGROUND OF THE INVENTION

The current distributed file systems employed by big data platforms offer a capability to enforce pre-defined data storage allocation limits of each electronic directory. However, enforcing such pre-defined storage allocation limits is typically constraining and inflexible to real-time changing storage and growth needs of the big data platforms.

An example implementation of the distributed file systems for big data platform is the Hadoop™ distributed files system (also referred to as HDFS). Apache Hadoop™ (hereinafter "Hadoop™") is an open-source software framework for developing software for reliable, scalable and distributed processing of large datasets across clusters of commodity machines. Hadoop™ is a specific example of a software framework designed for performing distributed data analytics on very large datasets. Hadoop™ includes a distributed file system, known as Hadoop Distributed File System (HDFS™). Generally, such distributed file systems link together the file systems on local nodes to form a unified file system that spans the entire cluster (e.g. Hadoop™ cluster).

The Hadoop™ platform in general provides a set of APIs that enable the administrator of the platform or other user to manually read a number of data storage parameters for each directory, such as the disk usage and space quota.

Also, such distributed file system platforms such as HDFS allow an administrator to manually set specific quotas for the amount of space to be used for each of the individual directories and/or total amount of space for all directories. The administrator may provide name quotas and/or space (or disk) quotas for one or more directories which operate independently of one another.

The administrator pre-defined storage space or disk quota for the directories is a hard limit on the number of bytes allows to be used by files in a particular directory. If users are attempting to increase the size of the files, or add new files in a directory that in total would be over the limit of the imposed (administrator and/or otherwise pre-defined) quota, then the platform would block such action immediately or even prior to when the limit is reached. Also, the HDFS block allocation will fail if the quota would not allow a full block to be written. Each replica of a block counts against the quota, thus the platforms with high replication model with have an implicit lower density of data related to space quota.

Generally, in a big data cluster environment including in an HDFS platform, there are typically different development teams working concurrently, each one on different project (associated with different file directories with some possible overlap), but sharing the resources for the cluster and the data storage available in general for the whole cluster.

Typically, such development team(s) would create a working space in the HDFS, like a directory that would serve as the root directory for their project. Then each team would create its own subdirectories and files as suitable for its own project, generate its own test or development data, and run the analytics on its own data space (e.g. associated with a particular directory), specific to each project.

It is typical for the storage resources of each team's directory to grow over the time, and if left unsupervised and un-attended, to grow well over the initially anticipated and/or desirable limits.

The typical action of the HDFS administrator is to limit the sharing resources of each project master directory, such as to impose quotas on the storage limits. This ensures that multiple development teams can work concurrently in parallel, without affecting each other in terms of the data storage available or taking away the cluster resources from other teams. It also ensures that each development team can know in advance what are the storage limits allocated for its project, and thereby enforce accountability of each team in properly using the allocated storage resource to the corresponding master directory of the project.

The current state of the art in allocating and limiting the specific quotas on each of the directories of distributed file systems has a number of limitations.

For example, setting the quotas allocated to a directory is a manual process performed by a system administrator. The actual value of the quota is empirically calculated or set by the platform administrator, based on the administrator's expectations of the storage needs for a project and its associated directories.

If the electronic data storage needs of a project requiring the use of multiple directories of the big data platform changes over time, then the administrator will need to manually reassess and manually adjust the allocated quotas on the device to ensure enforcement of the adjusted quotas.

Such a manual storage quota setting process whereby a system administrator initially defines a fixed storage threshold for each project's directory and then only manually re-adjusts the fixed storage threshold for one of the directories upon reaching or exceeding the fixed threshold for that directory presents numerous disadvantages. Notably, this approach is time-consuming, not scalable, inaccurate (e.g. subject to the administrator's judgement of a new threshold), and leads to data loss (e.g. data is unable to be stored once the threshold is reached until a manual request is processed from the administrator to set a new limit).

This manual interaction with the platform is especially not effective as the number of directories required and the number of users accessing the directories grows. For example, when managing a large number of teams within an organization that implicitly require access to storing data and/or manipulating data on a large number of computer directories on the big data platform.

Another limitation of the current storage systems is that the process of managing and setting storage quotas on the big data platform directories is defined such that if the space usage does reach a pre-defined limit (e.g. manufacturer defined or manually defined or otherwise pre-set), the storage system will simply block the addition of more data to the directory having reached the limit. This could result in unexpected loss of productivity or functionality within that workspace.

Another limitation of the current state of the art in storage management is that the system is only capable of reacting upon reaching the storage threshold value (e.g. to block further activity). At that point, it is often ineffective and time-consuming to be making further decisions on an action plan.

Also, due to the complexities involved with managing multiple directories, current data storage management systems have only been capable of examining each directory independently (or in isolation) of effects of any other directory in the storage system or the overall effects on total storage.

When managing a shared development environment between multiple teams that compete for the shared resources of the big data platform, the complexity increases beyond the capabilities of the manual intervention of the platform administrators. This problem grows significantly in complexity as the number of directories, teams and corresponding changing needs that is beyond the capabilities of manual management. Existing storage management systems are designed only to track when a storage threshold has been reached and to enforce that such thresholds are not surpassed.

The process of creating an accurate prediction of storage usage in a shared directory system of a distributed file management system is difficult and quite complex, as usage patterns can be highly variable and the shared file management aspect making the problem even more unmanageable and unpredictable.

Thus, there exists a need for an improved enterprise storage management system and corresponding methods to manage the shared computing and storage resources, including storage quotas of workspaces in big data platforms, in view of at least some of the deficiencies encountered in the prior art.

SUMMARY

It is to be understood that both the foregoing general description and the following detailed description are exemplary and explanatory only and are not restrictive of the claims.

In view of the shortcomings of the current art, it would be advantageous if future storage usage demands of a distributed file management system could be accurately anticipated, such that storage needs may be better managed for real-time use and adaptability within a shared distributed file system of a big data platform (e.g. HDFS).

Further, it would be desirable to have a system and method that dynamically and in real-time accurately predicts a distributed file system's future storage needs and dynamically adjusts storage quotas for one or more directories of the distributed file system based on the prediction. In one aspect, the method further comprises the dynamic adjustment of anticipated storage needs of one directory of the distributed file system being automatically balanced and correlated with anticipated storage needs of remaining other directories of the distributed file system.

In one aspect, the system and method accurately predict when a directory within the distributed file system is likely to require further storage space (e.g. is close to the storage quota or is anticipated to surpass the storage quota prior to the expected time period) and thus automatically adjusts the storage quota for said directory such as to adapt in real-time and prevent loss of information and/or productivity as mentioned above.

In a further aspect, the system and method evaluate the dynamic behaviour of the space usage of one or more directories relative to an allocated quota, and then takes decisions on informing users and/or to dynamically adjust the allocated quota limits to a new limit, based on anticipated space usage and relative to the total available resources of the data distributed file system (e.g. also referred to as data cluster).

In one aspect, when a particular directory of the data cluster reaches its allocated quota limit, or when the data storage behaviour of the particular directory would require adjustment of the allocated limits to a new limit, the new limit may be calculated based on the past history of that particular directory, based on an aggregated behaviour and space limitations of all the other directories in the data cluster and in consideration of the total amount of available storage resources for the data cluster.

The methods and systems may comprise any of the features described above in connection with one or more aspects of the disclosure. In yet another aspect, the storage management method is configured for detecting and interpreting the behaviour of the data storage of each directory space in view of associated allocated storage limits, by learning from prior history of space usage for each directory and dynamically configured to adjust the allocated storage limits automatically.

Preferably, the system and method are further configured to aggregate and harmonize the allocated resources of each workspace or directory, based on expected future needs of the entire distributed file system, related to trends, behaviours and allocation limits of all other workspaces or directories in the cluster, and the total amount of available storage resources at the cluster level.

Advantageously, the disclosed system and method improves efficiency of managing multiple and shared development workspaces in big data platforms.

In at least one aspect, there is provided a computer implemented method for automatically managing storage resources of a distributed file system, the method comprising: obtaining actual past storage usage data of a first directory from a plurality of directories of the distributed file system, the actual past storage usage data representative of storage usage at the first directory over a defined time period extending from a past time to a current time; detecting a space quota limit for the first directory, the space quota limit for providing a maximum limit on total storage for the first directory, the space quota limit associated with a pre-defined expected future time for providing a maximum amount of time for expecting use of resources of the first directory; determining, in real-time, based on the actual past storage data, projected storage usage data of the first directory, by inputting the actual past storage data into a trained machine learning model for determining a storage usage trend of the first directory, the projected storage usage data representing a future storage usage for the first directory over a future time period from the current time; obtaining an aggregated correction coefficient providing an indication of aggregated projected storage usage needs of remaining other directories of the plurality of directories relative to the first directory; in response to determining an expected value of a projected storage usage data at the expected future time is inconsistent with the space quota limit, adjusting the space quota limit to a new quota limit for the first directory based on the expected value weighted by the aggregated correction coefficient; and applying the new quota limit to the first directory from the current time.

In a further aspect, determining the new quota limit further comprises increasing the space quota limit to the new quota limit when the space quota limit is insufficient based on the projected storage usage data indicating that the space quota limit will be reached prior to the expected future time.

In a further aspect, the method comprises decreasing the space quota limit to the new quota limit when the projected storage usage data at the expected future time has a value below the space quota limit by at least a pre-defined amount.

In yet a further aspect, the weighting by the aggregate correction coefficient is further based upon an obtained value for total disk storage availability of a cluster defined by the plurality of directories of the distributed file system, the total disk storage availability indicating total amount of disk storage currently available for use by the plurality of directories and indicative of degree of possible change between the space quota limit and the new quota limit.

In yet a further aspect, the aggregated correction coefficient is further based upon: projecting respective storage needs of each of the plurality of directories using the trained machine learning model to determine a respective projected storage usage data for each of said directories and thereby a respective expected storage usage amount at the expected future time; and, determining the aggregated correction coefficient for each of the plurality of directories indicating a ratio of possible increase or decrease of respective space quota limit for each of the directories based upon the respective expected storage usage amount and the total disk storage availability for all of the plurality of directories.

In yet a further aspect, the space quota limit and the new quota limit provide different values for restricting a maximum number of bytes of disk space allowed to be used by files under a tree rooted at the first directory for respectively the current time and the expected future time, further to said adjusting.

In yet a further aspect, prior to determining the projected storage usage data of the first directory: training a machine learning model, to provide the trained machine learning model, using space usage training data representative of space usage of the first directory and selected ones of the remaining other directories pre-defined as being related to the first directory over a pre-defined time period.

In yet a further aspect, determining projected storage usage data of the first directory comprises using the actual past storage usage data to: define an interpolated curve representing a function of the actual past storage usage data extending from the current time to the past time; calculate a first derivative of the interpolated curve defining a first slope indicating a rate of change of the projected storage usage over time; calculate a first derivative of a moving average of the interpolated curve defining a second slope indicating an average rate of change of the projected storage usage over time; and, determine the projected storage usage data of the first directory as a function of the first derivative of the interpolated curve and the first derivative of the moving average.

In yet a further aspect, the calculated first derivative of the interpolated curve is used to project a first expected storage usage amount at the expected future time in the future time period and the calculated first derivative of the moving average is used to project a second expected storage usage amount at the expected future time in the future time period, and the new quota limit is an average of the first and the second expected storage usage amount weighted by the aggregated correction coefficient.

In yet a further aspect, the new quota limit is calculated as $Q_{1x}$ such that:

$$Q_{1x} = G_{ka}\left(k_1 \frac{dU_1}{dt} + k_2 \frac{dU_{1avg}}{dt}\right)T_{D1x} + B_1$$

and $k_1+k_2=1$, wherein, $G_{ka}$ is the aggregated correction coefficient, $k_1$ and $k_2$ are respectively pre-defined adjustment coefficients for the first derivative of the interpolated curve $$\frac{dU_1}{dt},$$

and the first derivative of the moving average of the interpolated curve $$\frac{dU_{1avg}}{dt},$$

$T_{D1x}$ is the expected future time and $B_1$ is a y-intercept point for storage usage providing a value of actual storage usage of the first directory at the current time.

In yet a further aspect, prior to obtaining actual past storage usage data receiving a trigger from a scheduler, indicating a scheduled scan of each of the plurality of directories for respective actual storage usage up to the current time used for obtaining the actual past storage usage data.

In yet a further aspect, the trained machine learning model comprises multiple machine trained machine learning models, each one configured for one of the directories of the plurality of directories.

In at least one aspect, there is provided a computer implemented method for a predictive machine learning engine for predicting data storage usage for managing storage resources of a distributed file system, the method comprising the steps of: determining trends and behaviour in received electronic past storage usage data for each directory of a plurality of directories of the distributed file system, the data extending from a current time to a past time using a first machine learning algorithm; obtaining a space quota limit for each said directory for imposing a maximum limit on total storage used by files in each said directory, the space quota limit having an associated expected future time such that expected use of the storage resources of each said directory is limited to prior to the expected future time; using the determined trends and behaviour to predict a projected storage usage data for each said directory extending for a future time period from the current time to a future time, including an expected storage usage amount for each said directory at the expected future time; comparing the expected storage usage amount to the space quota limit for each said directory to determine whether a projected need for increase or decrease of the space quota limit exists; when a pre-defined difference exists in the comparison, then: calculating a correction coefficient for each said directory which determines a weighting for the projected need based on aggregated projected need for each said directory relative to a total disk storage availability of the plurality of directories; adjusting the space quota limit to a new space quota limit for each said directory to reduce the pre-defined difference based on the weighting applied to the expected storage usage amount; and, generating the prediction machine learning engine for use in applying the new space quota limit to each said directory in the distributed file system having the pre-defined difference indicating the projected need for the increase or decrease.

In at least one aspect, there is provided a computer device for automatically managing storage resources of a distributed file system, the device comprising: a storage device storing instructions; a communications interface; at least one processor in communication with the storage device and the communications interface, the at least one processor configured to execute the instructions for: obtaining actual past storage usage data of a first directory from a plurality of directories of the distributed file system across the communications interface, the actual past storage usage data representative of storage usage at the first directory over a defined time period extending from a past time to a current time; detecting, a space quota limit for the first directory, the space quota limit for providing a maximum limit on total storage for the first directory, the space quota limit associated with a pre-defined expected future time for providing a maximum amount of time for expecting use of the resources of the first directory; determining, in real-time, based on the actual past storage data, projected storage usage data of the first directory, by inputting the actual past storage data into a trained machine learning model for determining a storage usage trend of the first directory, a projected storage usage data representing a future storage usage for the first directory over a future time period from the current time; obtaining an aggregated correction coefficient providing an indication of aggregated projected storage usage needs of remaining other directories of the plurality of directories relative to the first directory; in response to determining an expected value of a projected storage usage data at the expected future time is inconsistent with the space quota limit, adjusting the space quota limit to a new quota limit for the first directory based on the expected value weighted by the aggregated correction coefficient; and applying the new quota limit to the first directory from the current time.

In yet a further aspect, the at least one processor is further configured for: determining the new quota limit further comprises increasing the space quota limit to the new quota limit when the space quota limit is insufficient based on the projected storage usage data indicating that the space quota limit will be reached prior to the expected future time.

In yet a further aspect, the at least one processor is further configured for: decreasing the space quota limit to the new quota limit when the projected storage usage data at the expected future time has a value below the space quota limit by at least a pre-defined amount.

In yet a further aspect, the at least one processor is further configured for: weighting by the pre-defined aggregation coefficient further based upon an obtained value for total disk storage availability of a cluster defined by the plurality of directories of the distributed file system, the total disk storage availability indicating total amount of disk storage currently available for use by the plurality of directories and indicative of degree of possible change between the space quota limit and the new quota limit.

In yet a further aspect, the aggregated correction coefficient is further based upon: projecting respective storage needs of each of the plurality of directories using the trained machine learning model to determine the respective projected storage usage data for each of said directories and thereby a respective expected storage usage amount at the expected future time; and, determining the aggregated correction coefficient for each of the plurality of directories indicating a ratio of possible increase or decrease of respective space quota limit for each of the directories based upon the respective expected storage usage amount and the total disk storage availability for all of the plurality of directories.

In yet a further aspect, the space quota limit and the new quota limit provide different values for restricting a maximum number of bytes of disk space allowed to be used by files under a tree rooted at the first directory for respectively the current time and the expected future time, further to said adjusting.

In yet a further aspect, prior to determining the projected storage usage data of the first directory: training a machine learning model, to provide the trained machine learning model, using space usage training data representative of space usage of the first directory and selected ones of the remaining other directories pre-defined as being related to the first directory over a pre-defined time period.

In yet a further aspect, determining projected storage usage data of the first directory comprises using the actual past storage usage data to: define an interpolated curve representing a function of the actual past storage usage data extending from the current time to the past time; calculate a first derivative of the interpolated curve defining a first slope indicating a rate of change of the projected storage usage over time; calculate a first derivative of a moving average of the interpolated curve defining a second slope indicating an average rate of change of the projected storage usage over time; and determine the projected storage usage data of the first directory as a function of the first derivative of the interpolated curve and the first derivative of the moving average.

In yet a further aspect, the new quota limit is calculated as $Q_{1x}$ such that:

$$Q_{1x} = G_{ka}\left(k_1 \frac{dU_1}{dt} + k_2 \frac{dU_{1avg}}{dt}\right)T_{D1x} + B_1 \text{ and } k_1 + k_2 = 1$$

wherein, $G_{ka}$ is the aggregated correction coefficient, $k_1$ and $k_2$ are respectively pre-defined adjustment coefficients for the first derivative of the interpolated curve $$\frac{dU_1}{dt},$$

and the first derivative of the moving average of the interpolated curve $$\frac{dU_{1avg}}{dt}$$

$T_{D1x}$ is the expected future time and $B_1$ is a y-intercept point for storage usage providing a value of actual storage usage of the first directory at the current time.

In yet a further aspect, the calculated first derivative of the interpolated curve is used to project a first expected storage usage amount at the expected future time in the future time period and the calculated first derivative of the moving average is used to project a second expected storage usage amount at the expected future time in the future time period, and the new quota limit is an average of the first and the second expected storage usage amount weighted by the aggregated correction coefficient.

In yet a further aspect, prior to obtaining actual past storage usage data receiving a trigger from a scheduler, indicating a scheduled scan of each of the plurality of directories for respective actual storage usage up to the current time used for obtaining the actual past storage usage data.

In yet a further aspect, the trained machine learning model comprises multiple machine trained machine learning models, each one configured for one of the directories of the plurality of directories.

In at least one aspect there is provided a non-transitory computer readable medium having stored thereon computer program code configured, when executed by one or more processors, to cause the one or more processors to perform a method for automatically managing storage resources of a distributed file system, the method comprising: obtaining, in real-time, actual past storage usage data of a first directory from a plurality of directories of the distributed file system, the actual past storage usage data representative of storage usage at the first directory over a defined time period extending from a past time to a current time; detecting, a space quota limit for the first directory, the space quota limit for providing a maximum limit on total storage used by the first directory, the space quota limit associated with a pre-defined expected future time for providing a maximum amount of time for expecting use of the resources of the first directory; determining, in real-time, based on the actual past storage data, projected storage usage data of the first directory, by inputting the actual past storage data into a trained machine learning model for determining a storage usage trend of the first directory, the projected storage usage data representing a future storage usage for the first directory over a future time period from the current time; obtaining an aggregated correction coefficient providing an indication of aggregated projected storage usage needs of remaining other directories of the plurality of directories relative to the first directory; in response to determining an expected value of the projected storage usage data at the expected future time is inconsistent with the space quota limit, adjusting the space quota limit to new quota limit for the first directory based on the expected value weighted by the aggregated correction coefficient; and applying the new quota limit to the first directory from the current time.

DESCRIPTION OF THE EMBODIMENTS

The present disclosure provides methods and systems for managing storage demand(s) of big data platforms having distributed file management. While various embodiments of the disclosure are described below, the disclosure is not limited to these embodiments, and variations of these embodiments may well fall within the scope of the disclosure.

Reference will now be made in detail to embodiments of the present disclosure, examples of which are illustrated in the accompanying drawings. Wherever possible, the same reference numbers will be used throughout the drawings to refer to the same or like parts.

Figure 1A:
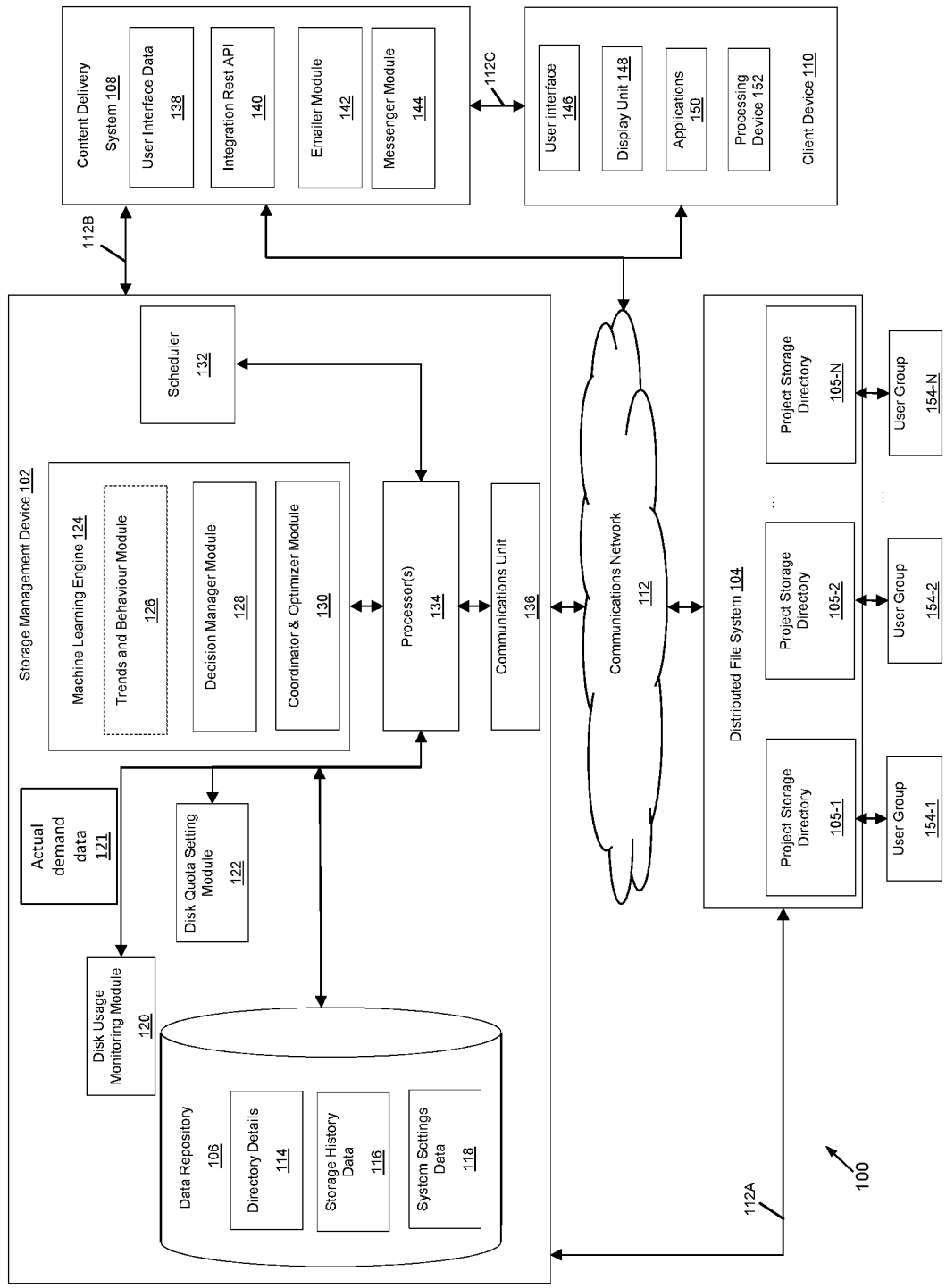
FIG. 1A is a schematic diagram of an exemplary computer implemented storage management environment, in accordance with one or more disclosed embodiments.

As used in the present disclosure, the term "computer" or "computer device" is intended to encompass any suitable computerized processing device. For example, this may include any computer or processing device such as, a blade server, general-purpose personal computer (PC), Mac®, workstation, UNIX-based workstation, or any other suitable device. Moreover, although FIG. 1A illustrates single computer device(s) in communication with one another, a big data distributed file system platform can be implemented using a plurality of computer systems, as well as computers other than servers, including a server pool. For example, a distributed file system instance may consist of hundreds or thousands of server machines, each storing part of the file system's data. Generally, a distributed file system or network file system is a file system that allows access to files from multiple host computers sharing via a computer network. Typically, such distributed file systems hold very large amount of data and provides accessibility (e.g. reading, writing, creating, deleting, replication of data blocks, and processing) of file system data. To store such huge data, the files are stored across multiple machines. This makes it possible for multiple users on multiple machines to share files and storage resources. In other words, the present disclosure contemplates computers other than general purpose computers, as well as computers without conventional operating systems.

As used herein, the following terms expressly include, but are not to be limited to:

"Metadata" means information about a file, such as its size, location, creation time, modification time, access permissions, redundancy parameters, and the like. Metadata is all forms of data that describe a file, as opposed to being the data in the file itself. In general, the size of this information is much smaller than the size of the file itself.

"Data" means the actual content of a file, as opposed to file metadata.

"File system" refers to a component of an operating system responsible for managing files.

"Distributed file system" is a file system which runs on more than one computer (e.g. also referred to as a host). Distributed file system may be a client/server-based application that allows clients to access and process data stored on a server of the distributed file system as if running on a local machine.

A storage management computing device may refer to a device for managing data storage on one or more data devices.

As disclosed herein, the use of "or" means "and/or" unless stated otherwise. Furthermore, the use of the term "including," as well as other forms such as "includes" and "included," is not limiting. In addition, terms such as "element" or "module" or "component" encompass both elements and components comprising one unit, and elements and components that comprise more than one subunit, unless specifically stated otherwise. Additionally, any section headings used herein are for organizational purposes only, and are not to be construed as limiting the subject matter described.

Generally, the present disclosure provides computer implemented methods and systems for managing storage demands for big data platforms (e.g. distributed file systems).

While various embodiments of the disclosure are described below, the disclosure is not limited to these embodiments, and variations of these embodiments may well fall within the scope of the disclosure which is to be limited only by the appended claims.

Referring to FIG. 1A, shown is a schematic diagram of an exemplary computing environment 100 used for predicting and managing storage demands of a big data distributed file system, in accordance with one or more disclosed embodiments. As illustrated in FIG. 1A, the environment 100 comprises one or more devices, including a storage management device 102 including a data repository 106, a big data distributed file system 104, a content delivery system 108, and one or more client devices 110, interconnected either directly and/or via a communications network 112. Examples of the communications network 112 include, but are not limited to, a wide area network such as the Internet, a wireless local area network (LAN), a network using radio frequency (RF) communication protocols, a Near Field Communication network (NFC), and a wireless metropolitan area network (MAN).

Further, as illustrated in FIG. 1A, the components in the environment 100, (e.g. the storage management device 102, the distributed file system 104, the content delivery system 108, and the one or more client devices 110), may also exchange data across a direct channel of communications, including direct communications channels 112A, 112B, and 112C. The direct communications channels 112A-112C may comprise direct wired or wireless communications channels.

The distributed file system 104 comprises a plurality of project storage directories 105-1, 105-2, . . . , 105-N (collectively project storage directories 105), also referred to as projects or directories herein. Typically, every organization unit (e.g. accounting department, human resources department, or engineering team) has a dedicated directory or node on a distributed file system (e.g. HDFS) and an associated group of users (e.g. user groups 154-1, 154-2, . . . 154-N, collectively user group 154) that has access to a particular organization unit (e.g. human resources department).

For example, as illustrated, a first project storage directory 105-1 may be accessed by a first user group 154-1, while a second project storage directory 105-2 may be accessed separately by a second user group 154-2 and project storage directory 105-N may be accessed by the Nth user group 154-N.

In one example, there may be a number of teams of developers, each one being associated to one or more projects, represented as User Group 1 to User Group N. Each project may be assigned a particular workspace in the distributed file system 104. The workspaces shown as project storage directories 105-1 . . . 105-N may be HDFS directories, each one serving as a master place where all of the development and the associated data of that project is stored on.

For example, each HDFS directory shown as project storage directory 105 is the data storage workspace assigned to a project, and where the storage limits for each directory are allocated, monitored and enforced by the environment 100.

Generally, each project storage directory 105 may have an associated maximum storage amount (e.g. number of bytes allowable for storage of files within that directory). As described above, in typical distributed file systems once the maximum storage amount for a particular directory is reached, further activity for that particular directory is restricted (e.g. no further files may be stored on the particular directory and in some cases, further access to the directory may also be limited).

In the present disclosure and as illustrated in FIG. 1A, the environment 100 is configured, in operation, to forecast projected storage needs of each of the storage directories 105 (e.g. based on machine learning algorithms and past storage demands), and dynamically adjust, in real-time, the maximum allowable storage amounts for each of the directories in response to the projected needs for the directories. Additionally, in at least some aspects, the adjusted maximum allowable storage amount for a particular directory is also dependent upon the projected storage needs of the remaining other directories in the shared distributed file system 104 and the total storage capacity allocated for the entire distributed file system for all of the project storage directories 105. This results, in one example, decreasing the maximum allowable storage amount for one directory (e.g. 105-2) based on real-time forecasted storage needs (e.g. as performed by the machine learning engine 124) indicating that a portion of the maximum allowable storage amount for 105-2 will not be used and thus allowing an increased amount of storage for the remaining other directories (e.g. 105-1 and 105-N), as may be coordinated by the coordinator and optimizer module 130.

The storage management device 102 (also further illustrated in FIG. 1B) comprises one or more software modules, including a disk usage monitoring module 120, a disk quota setting module 122, a machine learning engine 124 further comprising a trends and behaviour module 126, a decision manager module 128, a coordinator and optimizer module 130, and a scheduler 132. The storage management device 102 further comprises one or more processors 134, one or more memory devices including data repository 106, coupled to the processors and one or more network interfaces. The device further comprises a communications unit 136 for communicating within the storage management device 102 (e.g. between components 120, 122, 124, 132, 134, and 106) and/or for managing communications with external devices within the environment 100.

The storage management device 102 comprises one or more processors 134 communicative with one or more tangible, non-transitory memories (e.g. data repository 106) that store data and/or software program instructions. Accordingly, the processors 134 execute computer program instructions (e.g. an operating system and/or modules 120, 122, 124, 126, 128, 130, and 132) to perform any of the methods described herein.

In operation, the disk usage monitoring module 120 is configured to monitor and receive metadata from the data repository 106 which comprises directory details 114, storage history data 116, and system settings data 118 for the directories 105. The storage history data 116 comprises actual historical data of storage use (e.g. total number of bytes used for project storage directories 105-1 . . . 105-N over a prior time period) for each of the storage directories 105. The system settings data 118 comprises actual total capacity of the distributed file system 104 for storing files, and the maximum allowable storage amount attributed to each of the project storage directories 105.

The data repository 106 stores detailed configurations and directory/file metadata such as naming conventions of each directory (e.g. directory details 114), including the allocated storage limits (e.g. system settings data 118). The data repository 106 also stores the actual measured storage usage history of each directory (e.g. storage history data 116).

The trends and behaviour module 126 is configured to communicate with the disk usage monitoring module 120 and/or data repository 106 and generate forecasted storage demand data that characterizes an expected demand for one or more of the project storage directories 105 (e.g. 105-1) during a future time interval, such as a future time period from the current time up to an expected future time, e.g. the expected time duration of use of each of the storage directories 105. The trends and behaviour module 126 includes a trained machine learning model that is used for forecasting a future storage demand (i.e. projected or expected storage usage) at each directory 105-1 . . . 105-N, as described in further detail below.

In at least one aspect, the trained machine learning model provided by the trends and behaviour module 126 comprises multiple machine trained machine learning models, each one configured specifically for a respective one of the directories of the plurality of directories.

For example, user group 154-1 is expected to use the first storage directory 105-1 for a specific project X estimated to last up to the expected duration of expected future use time (e.g. project duration). Further and as described herein, the machine learning engine 124 and particularly the trends and behaviour module 126 may compute the expected storage demand based on computations from actual demand data 121 provided by the disk usage monitoring module 120 (based on portions of data from the data repository 106) for the one or more project storage directories 105 during prior time interval, such as a prior time interval, e.g. extending from the current time to a past time (P). For example, the past time (P) may correspond to the first use of the storage directory 105-1. Thus, actual demand data 121 indicates from the storage history data 116, actual storage usage values (e.g. number of bytes as a function of time) from the past time up to the present time.

Further, in at least some aspects as described herein, the trends and behaviour module 126 may compute the expected or forecasted storage demand for each of the directories 105 by first establishing a curve (e.g. a best fitting curve) of the actual demand data 121. Based on the established curve, the forecasted storage demand may further be defined as a function of at least one of: a computed first derivative of the curve projected to at least the expected future time (e.g. metadata characterizing a time in the future when the project for the particular directory is expected to last until and thereby expected storage usage of resources for the particular directory) and a computed first derivative of a moving average of the curve projected to the expected future time. In some aspects, the forecasted storage demand data for a directory may be based on a relationship (e.g. an average or a median curve) of the computed first derivative of the curve projected to at least the expected future time and the computed first derivative of the moving average of the curve projected to the expected future time.

As will be described, the projected expected storage demand for a directory (e.g. 105-1) may be used by the decision manager module 128 to compare to the maximum allowable storage amount for the directory (e.g. 105-1), which may be provided by the system settings data 118.

Additionally, the coordinator and optimizer module 130 is configured to track and monitor the expected projected demands of each of the directories (e.g. 105-1 . . . 105-N) as computed by the trends and behaviour module 126 and based on the forecasted demands as compared to the total allocated storage capacity for the entire shared distributed file system 104 (e.g. total storage amount allocated for the directories 105-1 . . . 105-N) and relative to the forecasted demands of the plurality of directories 105 considered as a whole, subsequently determines a forecasted demand weighting for each of the directories (also referred to as an aggregated correction coefficient), based on the correlation of predictions of all project storage directories 105 and total cluster disk availability. For example, as will be described, the coordinator and optimizer module 130 takes into account whether, based on forecasted demands, each of the storage directories 105 requires an increased quantity in allocated storage amount, a decreased quantity in allocated storage amount, or no change in the allocated storage amount. The coordinator and optimizer module 130 then determines the forecasted demand weighting for each of the storage directories 105, as a function of the expected forecasted demands of all of the remaining other directories and the total allocated storage capacity for the entire distributed file system 104.

The decision manager module 128 is then configured to communicate with at least the modules 126 and 130 to determine an adjusted maximum storage amount (e.g. new space quota limit) for each directory 105-1, . . . 105-N and provide same to the disk quota setting module 122 which is configured to provide the adjusted storage amount to the data repository 106 for updating the system settings 118 and to apply the new space quota limit for each directory 105 having its maximum storage amount adjusted. In this way, the adjusted maximum storage amount for each directory 105 as computed by the decision manager module 128 accounts for both forecasted storage demands (e.g. as provided by module 126) and the relative forecasted storage needs of all directories within a cluster of the distributed file system 104 (e.g. as provided by module 130).

For example, as described herein, the trends and behaviour module 126 may establish based on the projected storage demands, a desired adjusted storage amount for each directory. In one example, the desired adjusted storage amount for a particular directory (e.g. 105-1) is equal to forecasted storage demand data at the pre-defined expected future time, as generated according to the methods described herein.

As also described herein, the coordinator and optimizer module 130 establishes the forecasted demand weighting factor as input to the decision manager module 128 and thus the decision manager module 128 is configured to apply the forecasted demand weighting factor to the desired adjusted storage amount (or forecasted storage demand data) to obtain the new space quota limit for each said directory 105 and apply same, via the disk quota setting module 122, to the distributed file system 104 for subsequent enforcement thereof.

The disclosed embodiments are not limited to these examples of actual or forecasted storage demand data.

Referring again to FIG. 1A, the storage management device 102 may also include a scheduler 132 which is configured to periodically trigger the operations of modules 120, 124 and/or 122. For example, the scheduler 132 may periodically instruct the trends and behaviour module 126 to retrieve the actual demand data 121 for one or more directories 105 (e.g. via the disk usage monitoring module 120 extracting the storage history data 116) and generate the forecasted storage demand data (e.g. as will be described with reference to FIGS. 6 and 7) to determine whether adjustment of the maximum allowable storage thresholds is necessary for one or more storage directories 105. The scheduler 132 may have a pre-defined time interval or may be dynamically defined timing based on the machine learning engine 124 indicating optimal time intervals for re-evaluating the forecasted storage needs.

Referring again to FIG. 1A, the environment 100 further comprises a content delivery system 108 which may be a web server, an application server, cloud container, or an application platform for communicating with the storage management device 102 and determining output data related to the forecasted storage demands, maximum storage amount, and/or new space quota limit to display on the client device 110.

Referring again to FIG. 1A, shown also are the content delivery system 108 and the client device 110 which may communicate across the communications network 112 and/or directly via 112C. The content delivery system 108 comprises user interface data 138, Integration REST API 140, an emailer module 142 and a messenger module 144. The emailer module 142 and the messenger module 144 are configured to provide instructions for notifying users of the client device 110 about events occurring in the storage management device 102 such as predicted changes to the storage uses needs of one or more directories 105, including sending emails via the emailer module 142 or sending a text message via the messenger module 144 (e.g. for use in any one or more of the following ways: to be presented on the client device 110 via the user interface 146, display unit 148, for use by one or more applications 150 for example for receiving subsequent feedback from a user of the client device 110 regarding changes).

Referring again to FIG. 1A, client device 110 comprises a user interface 146, a display unit 148, software application (s) 150, and a processing device 152. The processing device 152 configured to execute one or more instructions to implement the operations described herein for the user interface 146, the display unit 148, and applications 150. The client device 110 may receive content from the content delivery system 108 relating to one or more changes in storage usage demands and/or projected storage usage demands of the directories 105 and, according to some aspects, request a confirmation response from the client device 110 as to whether the allocated storage size for the one or more directories 105 associated with a change should be adjusted accordingly.

User interface 146 may also support user interactions with the distributed file system 104 such as initial configuration (e.g. storage size settings) of project storage directories 105. The user interface 146 also presents updates and receives feedback for details of an existing project, different parameters of system settings (e.g. relating to system settings data 118), assigns projects to user groups 154, and other administrative tasks requiring administrator of user input. The content delivery system 108 and the client device 110 including the user interface 146 could be local or web-based served from a web server, application server, or a cloud contained. In one aspect, the user interface 146 provides a graphical interface via the display unit 148 for presentation to a user, e.g. an administrator of the computing environment 100 such as to configure various system settings.

Figure 1B:
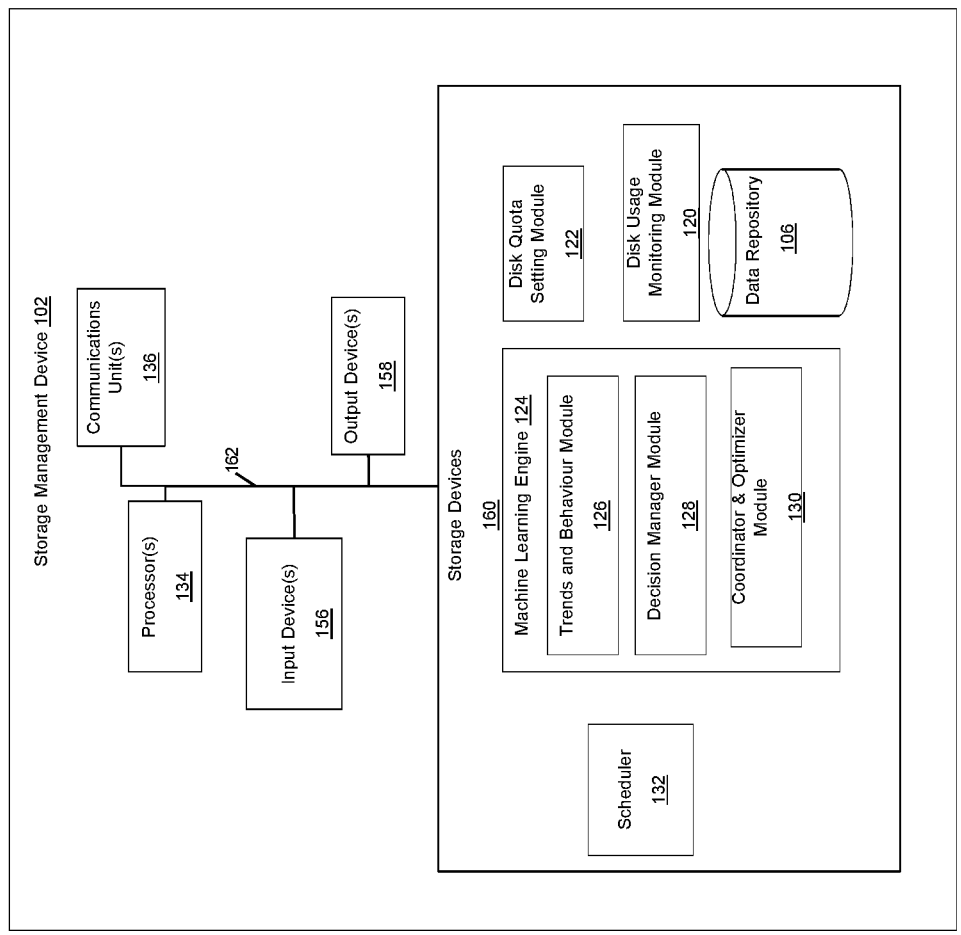
FIG. 1B is a schematic diagram of an example storage management computer device of FIG. 1A for automatically managing storage resources for a big data platform (e.g. distributed file system), in accordance with one or more disclosed embodiments.

Referring now to FIG. 1B shown is a block schematic diagram of a computer device, e.g. a storage management device 102 of FIG. 1A for automatically managing storage resources for a big data platform (e.g. distributed file system), in accordance with an embodiment.

As illustrated, the storage management device 102 comprises one or more processors 134, and one or more input devices 156. Input devices may be a keyboard, a key pad, buttons, pointing device, microphone, a camera or an IR sensor (receiver). The storage management device 102 further comprises one or more output devices 158 as well as at least one an optical output device. Output devices may include a speaker, light, bell, vibratory device, etc. An optical output device may be a display screen, or an IR transmitter or a projector. The storage management device 102 may have more than one display screen. It is understood that a display screen used in the storage management device 102 may be configured as an input device as well, for example, a gesture based device for receiving touch inputs according to various known technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

The storage management device 102 further comprises one or more communications units 136 (e.g. antenna, induction coil, external buses (e.g. USB, etc.) for communicating via one or more communication networks to one or more other computing devices, e.g. 104, 108, and 110.

The storage management device 102 further comprises one or more storage devices 160. The one or more storage devices 160 may store instructions and/or data for processing during operation of the storage management device 102. The one or more storage devices 160 may take different forms and/or configurations, for example, as short-term memory or long-term memory. Storage devices 160 may be configured for short-term storage of information as volatile memory, which does not retain stored contents when power is removed. Volatile memory examples include random access memory (RAM), dynamic random access memory (DRAM), static random access memory (SRAM), etc. Storage devices 160, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

The storage devices 160 store instructions and/or data for the storage management device 102, said instructions when executed by the one or more processors 134 configure the storage management device 102 to perform various operations and methods as described herein.

Instructions may be stored as modules such as the scheduler 132 for triggering performing forecasting of storage demand data, the machine learning engine 124 for performing the forecasting of expected storage demands (e.g. via the trends and behaviour module 126) of each of the directories 105 of the distributed file system 104 of FIG. 1A such as based on actual storage demand data and adjusting maximum allowable storage amount (e.g. storage quota limit) allocated to one or more of the directories 105 of FIG. 1A when the forecasted storage demands for said directories is inconsistent with the maximum storage amount currently allocated to the respective directory.

Instructions may further be stored for the coordinator and optimizer module 130 configured for determining a forecasted demand weighting factor (also referred to as the aggregate correction coefficient) for each one of the directories (e.g. 105-1) based on the forecasted storage demands of the remaining other directories (e.g. 105-2 . . . 105-N). Instructions may further be stored for the decision manager module 128 which utilizes the forecasted storage demand data as provided by the trends and behaviour module 126 to determine a desired storage amount for a particular directory (e.g. 105-1) and then apply the forecasted demand weighting factor thereto to generate the new space quota limit for the particular directory. Instructions may further be stored as the disk quota setting module 122 configured to retrieve the new space quota limit for the particular directory (e.g. 105-1) and apply it to the data repository 106 and/or directly to the distributed file system 104 for enforcement of storage amounts of 105-1 to be limited to a maximum defined by the new space quota limit.

Other modules are not shown such as an operating system, software applications, etc.

Communication channels 162 may couple each of the components 134, 136, 156, 158, and 160 for inter-component communications, whether communicatively, physically and/or operatively. In some examples, communication channels 162 may include a system bus, a network connection, an inter-process communication data structure, or any other method for communicating data.

The storage management device 102 may be a tablet computer, a personal digital assistant (PDA), a laptop computer, a tabletop computer, a portable media player, an e-book reader, a watch, a personal computer or a workstation, or a computer system or computer platform including one or more cloud computing or virtual machine(s) or computing container(s) running on such a computer system or platform, or another type of computing device. In at least some aspects, the data repository 106 may include structured or unstructured data records identifying and characterizing one or more project storage directories 105-1 . . . 105-N, and associated user groups 154-1 . . . 154-N.

Figure 2:
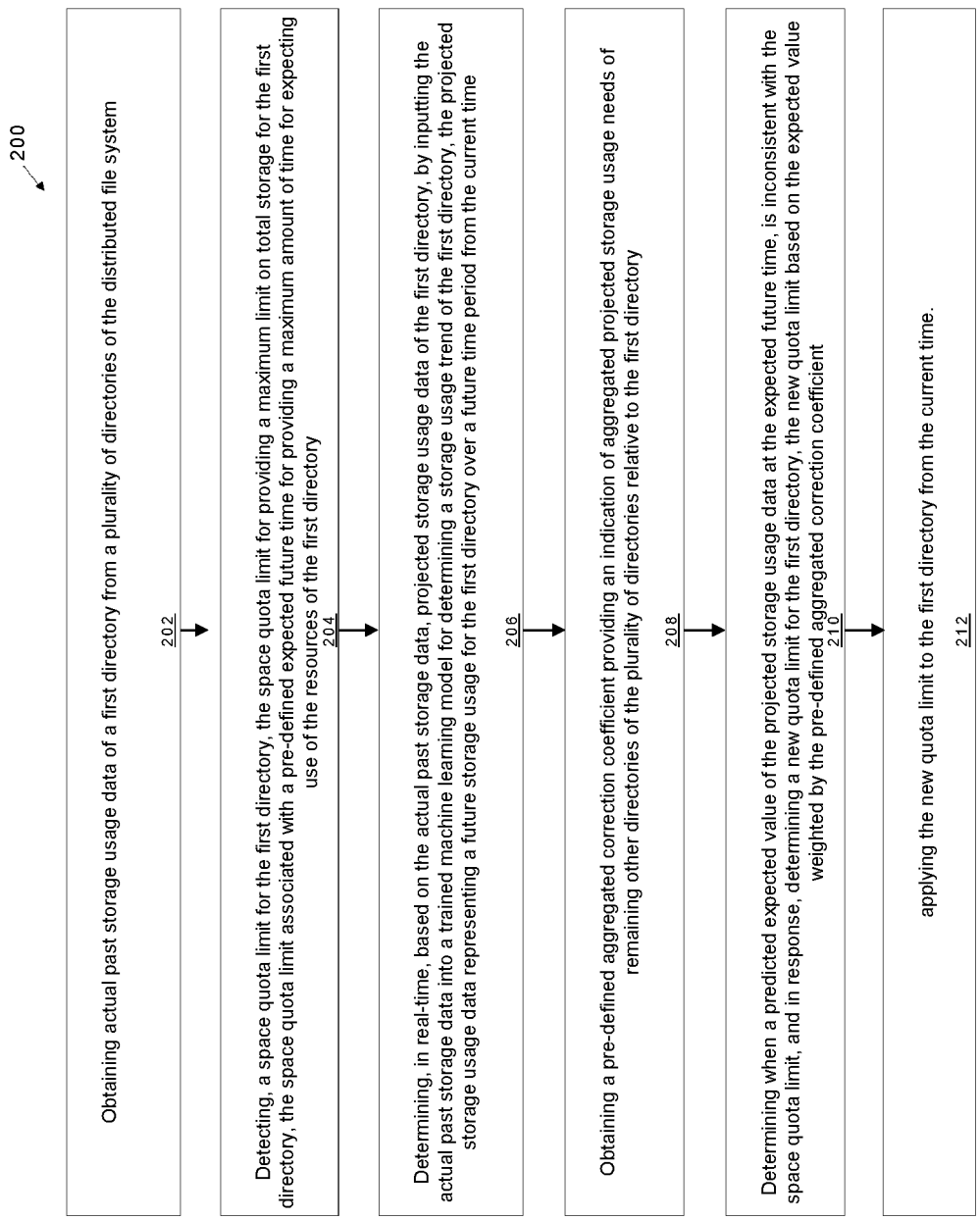
FIG. 2 is a flowchart illustrating an example operation of the storage management computer device of FIG. 1B, in accordance with one or more disclosed embodiments.

FIG. 2 shows a flowchart of operations 200 of an adaptive system for predicting and managing storage usage demands utilizing a storage management device 102 shown in FIGS. 1A and 1B, comprising at least one processor 134 in communication with at least one memory (e.g. storage devices 160) and at least one communication subsystem (e.g. communications unit 136). The at least one memory stores instructions, which when executed by the at least one processor 134, configure the storage management device 102 to perform operations, including operations 200.

At step 202, the storage management device 102 communicates with the distributed file system 104 and specifically, the project storage directories 105 to obtain actual past storage usage data of a particular directory, such as a first directory 105-1 of the distributed file system 104. This information may also be continuously stored and updated within storage history data 116. In one aspect, step 202 may be triggered by a scheduler 132 or by receiving an instruction from a user of the storage management device 102 (e.g. via the input device(s) 156) to initiate a storage demand forecast.

For simplicity, one or more embodiments of the present disclosure, describe tracking past storage usage and forecasting future storage usage of "a first directory", by way of example of a particular directory. The first directory 105-1, is a non-limiting example and the present disclosure is not limited to these embodiments. For example, it would be understood by a person skilled in the art, that the systems and methods described herein may be similarly applied to any other particular directory (e.g. 105-2, 105-3 . . . 105-N) of the project storage directories 105 configured to operate as described herein.

At step 204, the storage management device 102 further communicates with the distributed file system 104 to detect a space quota limit characterizing a current allowable storage capacity for the first directory 105-1. The space quota limit defines a maximum limit on total storage for the first directory 105-1 (e.g. total number of bytes used by files within the first directory). Additionally, the space quota limit for the first directory 105-1 is associated with a pre-defined expected future time which characterizes a maximum amount of time for expecting use of the resources of the first directory 105-1. For example, the expected future time, may characterize a project timeframe for which user group 154-1 is expected to access and/or store resources of the directory 105-1.

At step 206, the storage management device 102 utilizes a trained machine learning model (e.g. as provided by the trends and behaviour module 126) to determine, in real-time, projected storage usage data of the first directory representing a future storage usage for the first directory over a future time period from the current time. The actual past storage data is input into a trained machine learning model (e.g. trends and behaviour module 126) for determining a storage usage trend of the first directory and projecting same to determine a forecasted or projected storage usage demand data up to at least the expected future time.

In at least one aspect, training a machine learning model, to provide the trained machine learning model for the trends and behaviour module 126 includes using past space or storage usage training data representative of space usage data points of the first directory and selected ones of the remaining other directories pre-defined as being related to the first directory over a pre-defined time past period.

At step 208, the storage management device 102 determines an aggregated correction coefficient (e.g. via the coordinator and optimizer module 130) characterizing a forecasted demand weighting factor providing an indication of aggregated projected storage usage needs of remaining other directories (e.g. 105-2 . . . 105-N) of the plurality of directories relative to the first directory (e.g. 105-1). For example, such a weighting factor may indicate that several of the directories (e.g. 105-2, 105-3, and 105-4) also have increased forecasted storage demands as compared to the currently allowable storage amount for said directories (e.g. 105-2, 105-3, and 105-4) and therefore, since there is limited available overall storage capacity in the entire distributed file system 104 then each of the directories 105-1, 105-2, 105-3, and 105-4 may only be increased up to a portion of the forecasted storage usage demand data at the expected value (e.g. aggregate correction coefficient of 0.8 assigned to each of 105-1 . . . 105-4).

In one aspect, the weighting by the pre-defined aggregation coefficient is further based upon an obtained value for total disk storage availability of a cluster defined by the plurality of directories of the distributed file system. For example, the total disk storage availability indicates the total amount of disk storage currently available for use by the plurality of directories 105 and indicative of degree of possible change between the space quota limit and the new quota limit.

In a further aspect, the aggregated correction coefficient in step 208 is further calculated from first projecting respective storage needs of each of the plurality of directories (e.g. 105-1 . . . 105-N) using the trained machine learning model of the trends and behaviour module 126 to determine a respective projected storage usage data for each of said directories and thereby a respective expected storage usage amount at the expected future time. Subsequently, the aggregated correction coefficient for each of the plurality of directories is determined and indicates a ratio of possible increase or decrease of respective space quota limit for each of the directories 105 based upon the respective expected storage usage amount and the total disk storage availability for all of the plurality of directories 105.

At step 210, the storage management device 102 is configured to determine whether to adjust the space quota limit to a new quota limit in response to an inconsistency (e.g. a difference beyond a defined value) between an expected value of the projected storage usage data at the expected future time and the space quota limit, e.g. as currently allocated to the first directory 105-1. The new space quota limit is calculated for the first directory 105-1 (e.g. via the decision manager module 128) as a function of the expected value (e.g. indicative of forecasted storage demand at the end of the project timeframe requiring use of the first directory 105-1) and weighted by the aggregated correction coefficient. In some aspects, only when the difference between the expected value of the projected storage usage data at the expected future time relative to the space quota limit exceeds a pre-defined threshold amount then the new quota limit is calculated.

For example, when the inconsistency indicates that the space quota limit is insufficient based on the projected storage usage data predicting that the space quota limit will be reached prior to the expected future time needed for accessing the directory, then the machine learning engine 124 increases the space quota limit to the new quota limit.

In yet another example, when the projected storage usage data at the expected future time has a value below the space quota limit by at least a pre-defined amount, then the machine learning engine 124 decreases the space quota limit to the new quota limit. Conveniently, in this manner, this increases the space available for another directory within the cluster.

At step 212, the storage management device 102 is configured to apply, e.g. via the disk quota setting module 122 the new quota limit as determined in step 210 to the first directory 105-1 (e.g. as applied to the data repository 106 for subsequent access by the distributed file system 104 or applied in real-time directly to the storage directory 105-1 for immediate enforcement).

In one or more embodiments, operations performed by the storage management device 102 of FIGS. 1A and 1B for predicting and managing storage usage demands of each of the project storage directories 105 of the distributed file system 104, can include but are not limited to: predicting or forecasting storage usage of each particular directory (e.g. from the plurality of project storage directories 105) based at least on past storage usage of that directory. This prediction is performed at each iteration of the machine learning model of the machine learning engine 124 configured for the cluster (e.g. all of the project storage directories 105). Subsequently, after the forecasted and current storage usage of each of the directories from the plurality of project storage directories 105 have been evaluated (e.g. at each particular iteration), then an aggregated correction coefficient (also referred to herein as a global coefficient of adjustment) is computed for the whole cluster. This computed aggregated correction coefficient will be applied to each prediction function of storage usage of each directory 105, on the next iteration of the machine learning model of the machine learning engine 124. In at least some aspects, the aggregated correction coefficient may be initially pre-defined to a set value until after the first iteration of the machine learning model where it is then subsequently computed as per the methods disclosed herein for subsequent iterations.

Figure 3:
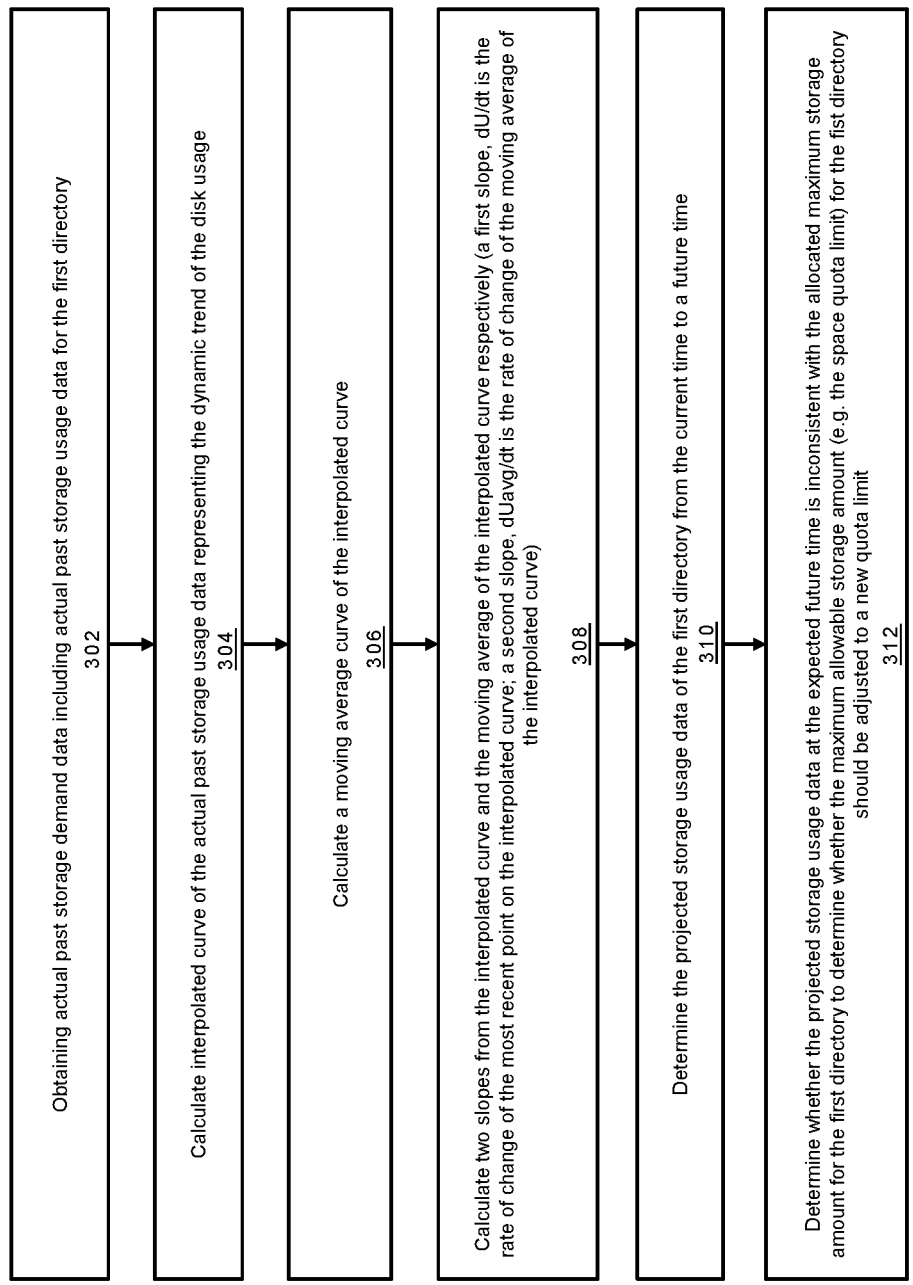
FIG. 3 is a flowchart of the machine learning engine module of FIGS. 1A and 1B, for determining trends and behaviours of storage usage in the distributed file system for subsequent use in managing storage usage, in accordance with one or more disclosed embodiments.

Referring to FIG. 3, shown is a flowchart of example operations 300 that may be taken by the trends and behaviour module 126 of FIGS. 1A and 1B when executed by the at least one processor 134, according to one embodiment.

At step 302, the module 126, operating as a trained machine learning model, obtains actual past storage demand data (e.g. actual demand data 121) for a particular directory (e.g. first directory 105-1). The actual past storage demand data comprises past storage usage data representing storage usage at the first directory 105-1 over a defined time period extending from a past time to the current time. The past storage usage data may be obtained for example by periodically obtaining electronic storage readings (e.g. determining total number of bytes used up by each of the files in the first directory) from the first directory 105-1. In addition, in one aspect, the past storage demand data comprises data indicating a maximum storage amount for the first directory 105-1, the expected future time of the first directory and/or total available storage size for the entire cluster (e.g. all of the directories 105). Additionally, the actual demand data 121 may include other directory 105-1 details as provided by data such as directory details 114, storage history data 116 and/or system settings data 118, including but not limited to: directory name and identification information (e.g. as provided by directory details 114), and date and time information representing the particular future time period desired to forecast (e.g. as provided by system settings data 118).

Preferably, the past storage demand data is continually obtained (e.g. in real-time) such that as more storage usage data points occur for the first directory, they are used as input to the machine learning model of the trends and behaviour module 126, thereby improving the accuracy of the forecasted storage usage demand data.

At step 304, the module 126 calculates an interpolated curve representing a function of the actual past storage usage data extending from the current time to the past time (e.g. using a regression model and/or other machine learning prediction algorithm). In one aspect, the interpolated curve is a smoothing curve calculated using moving average of small number of data points and represents the dynamic trend of the disk usage for the first directory.

At step 306, the module 126 calculates a moving average curve of the interpolated curve of step 304. The moving average curve is calculated using a time window with a pre-specified number of points and based on the interpolated curve. The moving average curve provides a smoothing operation such that the greater the number of points the smoother the curve.

At step 308, two slopes (or rates of changes) are calculated from the interpolated curve and the moving average of the interpolated curve respectively. A first derivative of the interpolated curve (dU/dt) is calculated defining a first slope indicating a rate of change of the projected storage usage over time, where U is the disk usage. Additionally, a first derivative of the moving average of the interpolated curve (dUavg/dt) defining a second slope indicating an average rate of change of the projected storage usage over time.

At step 310, the trends and behaviour module 126 determines the projected storage usage data of the first directory (e.g. at the expected future time defining the duration of the expected use of the first directory) as a function of the first derivative of the interpolated curve and the first derivative of the moving average.

At step 312, the trends and behaviour module 126 determines whether the projected storage usage data at the expected future time is inconsistent with the allocated maximum storage amount for the first directory. If inconsistent, i.e. the projection of dU/dt reaches a pre-defined threshold (e.g. the allocated maximum storage amount for the first directory) before the project timeframe, the trends and behaviour module 126 raises a flag to feedback decision manager module 128 to instruct adjusting the size of the allocated storage for the first directory.

If the projected amounts from step 310 doesn't reach the pre-defined threshold (e.g. the allocated maximum storage amount for the first directory) before the project timeframe defining the maximum timeframe, then no flag is raised and the maximum allowable storage amount (e.g. space quota limit) is not adjusted. In one aspect, the prediction indicates increasing the space quota limit to the new quota limit when the space quota limit is insufficient based on the projected storage usage data indicating that the space quota limit will be reached prior to the expected future time.

In one aspect, the calculated first derivative of the interpolated curve (step 308) is used to project a first expected storage usage amount at the expected future time in the future time period and the calculated first derivative of the moving average (step 308) is used to project a second expected storage usage amount at the expected future time in the future time period, and the new quota limit provided in step 312 is an average of the first and the second expected storage usage amount further weighted by the aggregated correction coefficient (see step 210 of FIG. 2).

In at least one aspect, the space quota limit and the new quota limit provide different values for restricting a maximum number of bytes of disk space allowed to be used by files under a tree rooted at the first directory 105-1 for respectively the current time and the expected future time (e.g. future time 30 in FIGS. 6 and 7), upon applying the new quota limit.

Any suitable machine learning model may be used for the purposes described herein (e.g. for one or more modules of the machine learning engine 124), including any existing machine learning models known to those skilled in the relevant arts or any suitable yet to be developed machine learning model. In some embodiments, the machine learning model is a supervised regression model such as a support vector regression (SVR) model. In other embodiments, the machine learning model is a neural network (NN) architecture such as a convolutional neural network (CNN), or recurrent neural network (RNN) including for example, a long short-term memory (LSTM) model.

In one exemplary aspect, the interpolated curve of the actual past storage usage data extending from a current time to a past time as provided by the trends and behaviour module 126 is modelled as a polynomial regression. Furthermore, in one aspect, linear regression of a first derivative of the interpolated curve (e.g. calculating the first derivative of the interpolated curve and/or the first derivative of the moving average of the interpolated curve of the first directory) is performed by the trends and behaviour module 126 and utilized to predict an estimated projected storage usage data of the first directory.

Additionally, in at least one aspect, the coordinator and optimizer module 130 utilizes a supervised neural network to model the expected project demands of the directories 105 such as to determine the aggregated correction coefficient, as described herein.

Figure 4:
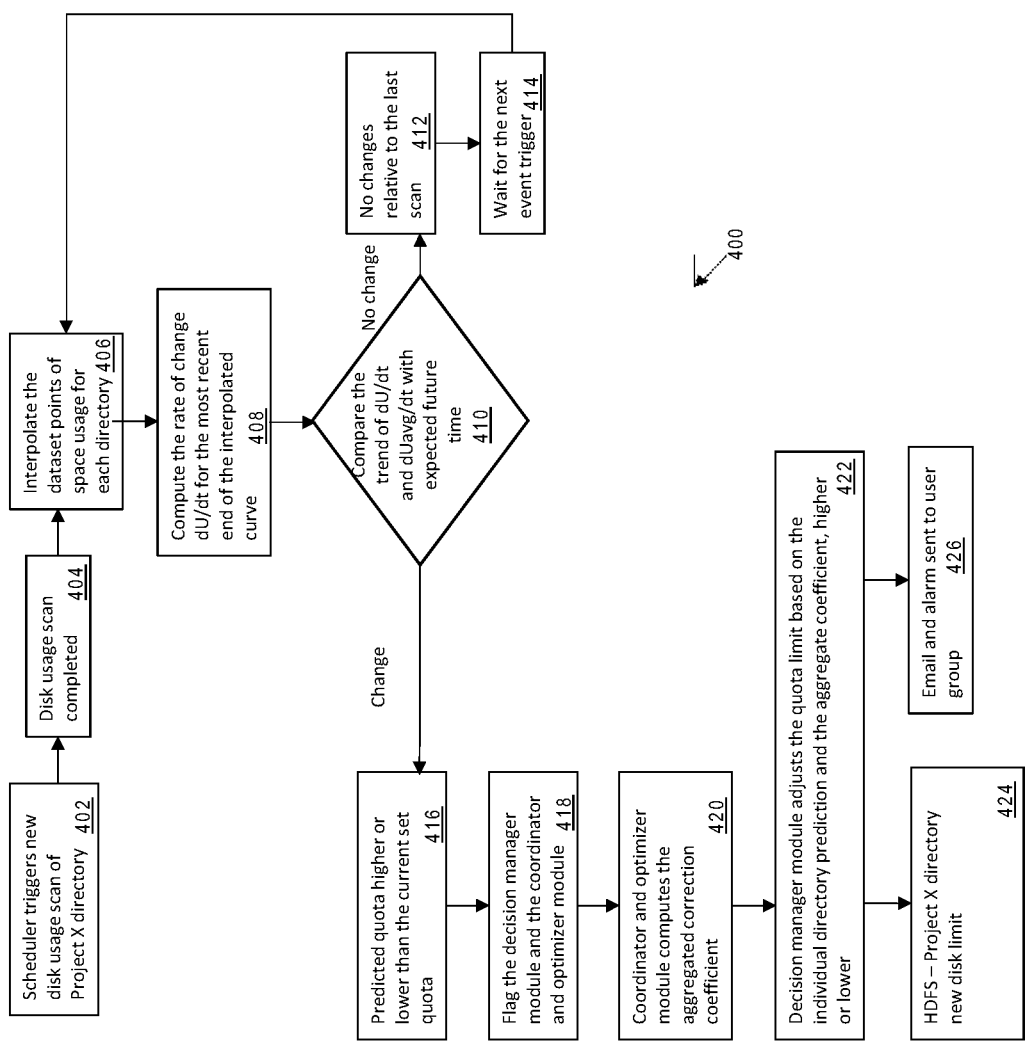
FIG. 4 is an example flowchart of operations of the storage management environment of FIG. 1A, in accordance with one or more disclosed embodiments.
Figure 5:
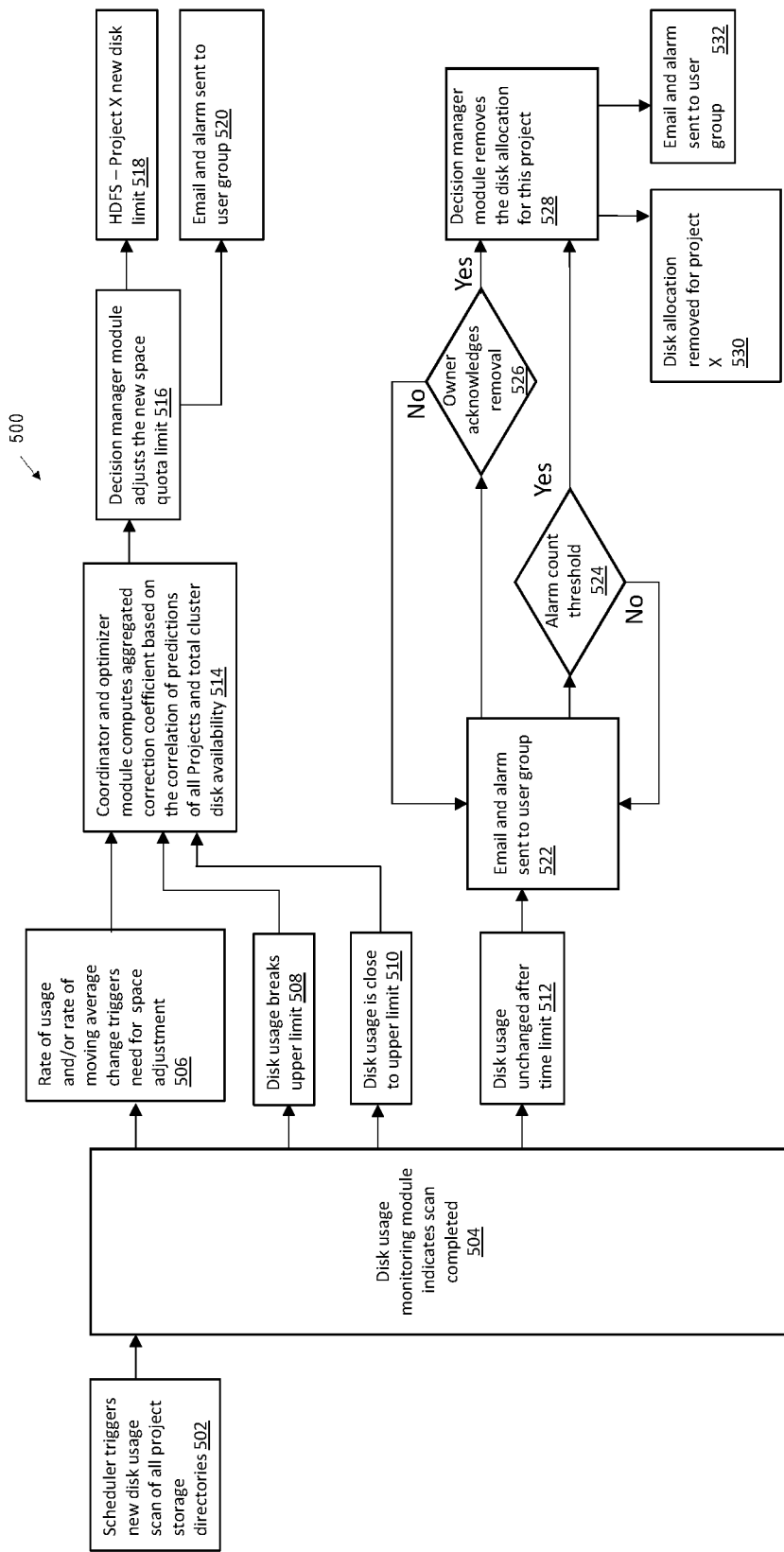
FIG. 5 is another example flowchart of operations of the storage management environment of FIG. 1A, in accordance with one or more disclosed embodiments.

Further example flowcharts of the various operation of the machine learning engine 124 of FIGS. 1A and 1B are depicted in FIGS. 4 and 5, in accordance with one or more disclosed embodiments.

Figure 6:
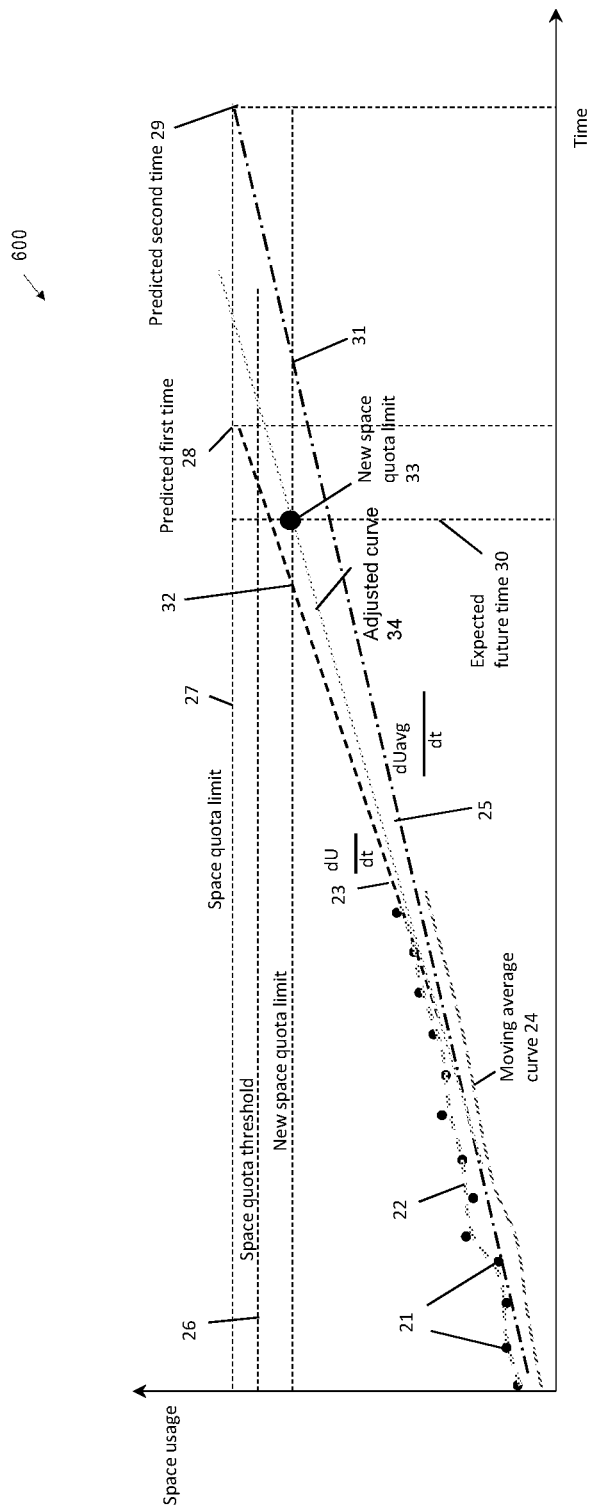
FIG. 6 is an example graph depicting how the machine learning engine of FIGS. 1A and 1B analyzes trends and behaviours of each directory based on received disk usage monitoring data in a distributed file system, in accordance with one or more disclosed embodiments.
Figure 7:
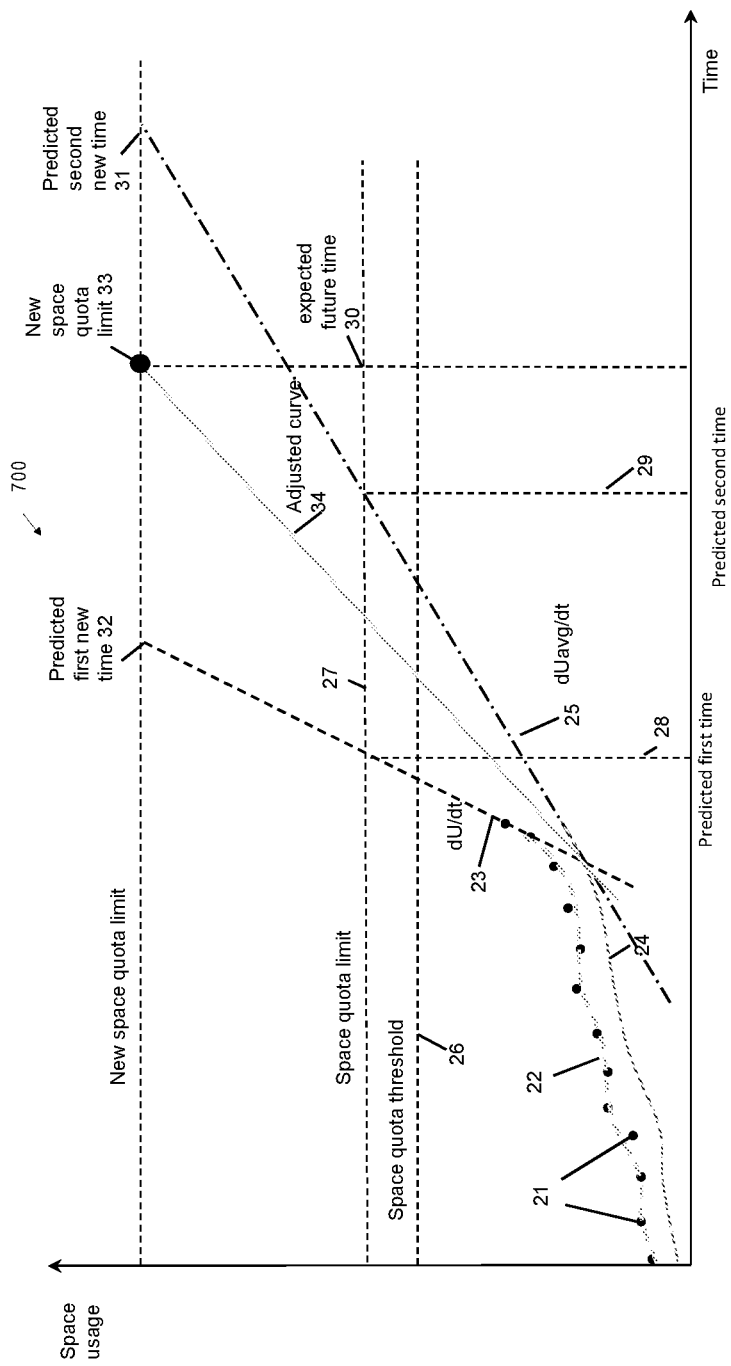
FIG. 7 is another example graph depicting how the machine learning engine of FIGS. 1A and 1B analyzes trends and behaviours of each directory based on received disk usage monitoring data in a distributed file system, in accordance with one or more disclosed embodiments.

Referring to FIG. 4, shown is an example flowchart of operations 400 which may occur for the storage management device 102 and particularly, the trends and behaviour module 126, in accordance with an embodiment. Also FIGS. 6 and 7 show example graphs for determining trends and behaviour as performed via one or more of the operations 200, 300 and/or 400 of FIG. 2-4. Referring again to FIG. 4, at block 402, the scheduler 132 triggers a new disk usage scan of a particular project X (e.g. corresponding to directory 105-1) and once the scan is completed at block 404, the data points of storage usage for each directory (e.g. 105-1 . . . 105-N) of each business project is obtained. The storage dataset 21 in FIGS. 6 and 7 depict actual storage space usage data for a particular directory (e.g. 105-1) taken over time. These may be stored as storage history data 116 in FIG. 1A. At block 406, the trends and behaviour module 126 then computes an interpolated function 22 (as depicted in FIGS. 6 and 7), based on the storage dataset 21. The role of the interpolated function is to smooth the variations of the dataset and is performed over a small-window moving average, almost identical with an instant moving average of the trend of the curve. The interpolated function 22 of the curve also allows subsequent computing of the rate of change of the curve, both instant and moving average.

At block 408, the trends and behaviour module 126, computes a rate of change of storage usage 23 (see FIGS. 6 and 7) for the particular directory, on the most recent reading of the interpolated curve, also shown as dU/dt. This rate of change represents the most recent trend of the disk usage for the particular directory and is able to predict the immediate direction of the trend.

For further detection of the trend, at block 410, a moving average curve 24 is determined from the interpolated function 22 of the curve. The moving average curve 24 further smooths the trend of the actual disk usage, and also provides a base of reference to compare it against the most recent rate of change dU/dt.

Based on the moving average of the interpolated curve 24, at block 410, the trends and behaviour module 126 computes a rate of change of the moving average curve 25, or dUavg/dt. This rate of change provides a base of reference of the general trend of the disk usage.

The next step performed in block 410 by the trends and behaviour module 126 is to compare the rate of change of the moving average dUavg/dt 25, with a recent or instantaneous rate of change of the interpolated curve dU/dt—also known as rate of change of storage usage 23 and with the existing space allocated quotas (e.g. space quota limit 27 and/or space quota threshold 26). In at least some aspects, the new space quota limit 33 may represent the adjusted version of one or both of the space quota limit 27 and the space quota threshold 26. In at least some aspects, the space quota threshold 26 in FIGS. 6 and 7 may represent a limit which triggers notifications to be sent out by the content delivery system 108 indicative of an early warning that the space quota limit 27 is close to being reached.

At block 410, the comparison also includes additional consideration to the expected time allocated to a project for the particular directory e.g. project storage directory 105 of FIG. 1A. For example, a master disk on the HDFS, associated to a business directory 105, usually has also an expected time allocated for that project or directory and is associated with at least one project storage directory (e.g. 105-1). In the example where the timeframe for a project is unlimited such as a permanent project, the rate of change curves 23 and 25 may predict when the disk usage will reach an allocated space or disk quota limit 27 shown as respectively a predicted first time 28 and a predicted second time 29. In the example of a limited timeframe associated with a project and use of the storage directory (e.g. 105-1), the limited timeframe characterized by the expected future time 30 is shown in FIGS. 6 and 7. The rate of change computed as dU/dt— also known as rate of change of storage usage 23 can predict a future timing, e.g. how soon (or late) the disk usage for the particular directory (e.g. 105-1) will reach the space quota limit 27, shown as predicted first time 28. By the same analogy, the rate of change of the moving average curve 25, also known as dUavg/dt will predict how soon (or late) the disk allocation of the particular directory (e.g. 105-1) will reach its space quota limit 27 shown as the predicted second time 29. For example, in the case of a slower rate of change for both the rate of change of the moving average 25 and the latest instant rate of change—also shown as rate of change of storage usage 23, the predicted first time point 28 and second time point 29 of reaching the space quota limit 27, are well behind the expected future time 30 of the project (characterizing the expected use timeframe for the project). Also, when comparing the future predicted first time value of the curve 25 dUavg/dt with the future predicted second time value of the rate of change of storage usage 23 curve calculated from dU/dt (e.g. 28 and 29), if the difference is relatively small (based on both, a preset level and a self-learned level), then the trends and behaviour module 126 determines that the short-term trend is in-line with the moving average trend. This points to a relatively stable disk usage of the project associated with the particular directory 105-1 and that the latest point in the dataset is within the predicted limits.

In one example, at block 412, there may be no need for the trends and behaviour module 126 to emit any event or alarm, or to take any further action. The module 126 will at block 414 simply wait for the next trigger to execute the operation again at block 406.

Referring again to FIGS. 4 and 7, in one example, one or more of the most recent data points of the storage dataset 21 reflecting storage usage as a function of time (e.g. indicating the storage usage of the particular directory, 105-1) of the dataset as shown in graph (FIG. 7) may display a sudden spike compared with the general trend. The interpolated function 22 of the curve also reflects the trend clearly. The most recent rate of change slope—dU/dt—also known as rate of change of storage usage 23 reflects even better the most immediate trend, is steeper than the rest of the curve.

For a base reference, the moving average of the curve 24 is computed and also the rate of change of the moving average 25 (e.g. slope) is computed by the trends and behaviour module 126 at block 410.

The trends and behaviour module 126 analyzes all of the computed values (e.g. perform operations 406, 408 and 410) discussed above. If the predicted storage usage demand defining a predicted quota is higher or lower than the currently set pre-defined quota limit as computed in block 416, then the decision manager module and the coordinator and optimizer module are flagged at block 418. For example, while the dUavg/dt value has a smaller increase compared with the first example described previously and illustrated by FIG. 6, now, in the example illustrated in FIG. 7, the slope or rate of change of the moving average curve 25 can predict that the available disk allocated to the particular directory (e.g. shown as space quota limit 27) will run out of space well ahead of the expected timeframe of the project, also known as expected future time 30 (e.g. predicted first time 28 for the slope of the usage curve dU/dt characterizing the time when the slope of the usage curve characterized by the rate of change of storage usage 23 will reach the current space quota limit and predicted second time 29 for the slope of the moving average of the usage curve dUavg/dt characterizing the time when the slope of the moving average curve 25 will reach the current space quota limit 27).

Notably, in FIG. 7, as shown by the graph 700, the most recent and instant rate of change of storage usage 23 curve, calculated by dU/dt (indicating rate of change of usage over time and projected into a future time from the current time), now has a steep value, much different than the one of the curve depicting the rate of change of the moving average 25. The rate of change of storage usage 23 curve predicts an imminent running out of space within an earlier timeframe, e.g. predicted first time 28, much earlier than the expected timeframe characterized by the expected future time 30 of the project, or even the predicted second time 29 as shown from the trend of the curve 25 of moving average rate of change dUavg/dt.

In the example depicted in FIG. 7, the trends and behavior module 126 is configured to notify the decision manager module 128 and the coordinator and optimizer module 130 if the forecasted storage demand differs from the pre-defined defined aggregated correction coefficient characterizing an adjusted weight to be applied to the currently allocated space quota limit 27 to obtain the predicted new space quota limit 33. For example, if the other directories (e.g. 105-2 . . . 105-N) in the cluster of the distributed file system 104 are not in an emergent case like the one in this example (e.g. 105-1), the aggregated correction coefficient defining the adjustment weight factor has a value of 1, that means no adjustment is made to the value predicted by the trends and behavior module 126.

Based on the newly adjusted and recommended value of the space quota (e.g. depicted as new space quota limit 33), the decision manager module 126 will adjust to the new space quota limit 33 for the particular directory 105-1.

The exact value of the new space quota limit 33 characterizing the adjustment can be as a function of, e.g. between the predicted first time 28 value (predicted by the forecasted trend of the rate of change of storage usage curve 23 calculated as dU/dt) and the predicted second time 29 value (predicted by the forecasted trend of the rate of change of moving average of storage usage curve 25—dUavg/dt). This depends of the initial settings of the system, and to a certain degree, the self-learning of the system.

For example, referring to FIG. 7, since both the predicted first time 28 and the predicted second time 29 of reaching the space quota limit 27 occur well before the expected future time 30 in FIG. 7 and indicate an increased storage space quota demand, the decision manager module 128 may be configured to determine an adjusted curve 34, a function of the slope of the storage usage (e.g. rate of change of storage usage 23 curve) and the slope of the moving average curve of storage use (e.g. rate of change of moving average of storage usage 25 curve), in order to determine the new space quota limit 33.

In the case of FIG. 7, the adjusted curve 34 is located somewhere between the curves 23 and 25. That is, the adjusted curve 24 is a weighted function of the curves 23 and 25 each adjusted by respective pre-defined adjustment coefficients or k-factors, and has a linear trend indicating it reaches a higher quota limit than the originally allocated space quota limit 27. Notably, the new space quota limit 33 exceeds the allocated space quota limit 27 at the expected future time 30. Put another way and as seen in FIG. 7, the slope of the usage curve, also known as the rate of change of storage usage 23 will reach the new space quota limit 33 at a predicted first new time 32, the slope of the moving average curve 25 will reach the new space quota limit 33 at a predicted second new time 31 and preferably, the adjusted curve 34 will reach the new space quota limit 33 at a point in time anywhere between the predicted first new time 32 and the predicted second new time 31 (e.g. at the expected future time 30). As will be described, this new space quota limit 33 may be further adjusted based on an aggregate weighting coefficient provided by the coordinator and optimizer module 130.

The decision manager module 126 will make a decision of whether to automatically adjust (or not) space quota limits 27 of the workspace triggered by the trends and behaviour module 126. If there are no other constrains, e.g. total availability of the disk space at the cluster level, or other workspaces having spike increases in the disk usage at the same time, competing for the shared resources of the cluster, then the decision manager module 126 will adjust the quota to a new value (e.g. the new space quota limit 33).

Preferably, the weight coefficient (also referred to as the k-factor) of the new value of the quota (e.g. for a particular directory 105-1) is either preset in the data repository 106 of FIGS. 1A and 1B, system settings data 118, or is dynamically and real-time computed based on at least the following two main factors by the coordinator and optimizer module at block 420: a) the dU/dt and dUavg/dt values from the trends and behaviour module 126 (e.g. curves 23 and 25 in FIGS. 6 and 7), and b) from correlating the usage statistics of all the other remaining workspaces or directories (e.g. 105-2 . . . 105-N) relative to the whole cluster (e.g. 105), their trends, their instant and average behaviour (e.g. as computed by the trends and behaviour module 126 such as to provide curves for rate of change of storage usage 23 and rate of change of moving average of storage usage 25 for each of the directories). The above-mentioned weight coefficient factor (also referred to as aggregated correction coefficient) for each directory to be adjusted are presented by the coordinator and optimizer module 130, back to the decision manager module 126.

The decision manager module 126, in one embodiment, and as depicted in block 422 of FIG. 4 is configured to make decisions, based on the input from the modules 126 and 130, as to whether to adjust the space quotas for each particular directory (e.g. 105-1 . . . 105-N) or not further specifically based on at least one or more of the following factors: the total storage available in a cluster (e.g. 105); the storage demand needs as projected by the remaining other directories; the current projected storage need (e.g. curve 23 and 25) for the particular directory having an inconsistency in the projected storage demand to the currently allocated storage quota limit.

In the embodiment of FIG. 4, at block 422 of FIG. 4, the decision manager module 126 will automatically execute the operation of adjusting the disk quotas for all the relevant projects (e.g. project storage directories 105) configured in the system as based on the projected needs for each of the directories 105, and the considerations mentioned above (e.g. comparison of projected storage needs to allocated storage quota and current/projected needs of other remaining directories in the cluster of the distributed file system 104), in real-time. Also, the decision manager module 126 dynamically computes the new space quota limit 33, based on the process steps implemented by the trends and behaviour module 126, as well as the weighting provided by the coordinator and optimizer module 130 and any further considerations of the remaining other directories projected storage needs. The new space quota limit 33 is then applied to the respective directories at block 424 by the disk quota setting module 122.

Conveniently, in at least some aspects, this approach is advantageous in distributed file systems as the number of managed workspaces is large, for example in a large enterprise, or when the development dynamics of each workspace changes fast, and thus the method of computing and applying new storage quota limits (e.g. new space quota limit 33 as applied in block 424 of FIG. 4) is executed by the components of environment 100 in real time.

Further conveniently, another exemplary advantage of the currently disclosed systems and methods, in at least one aspect is avoiding projects associated with one or more directories of the distributed file system from unexpectedly reaching their allocated storage quotas and lead to halting further storage operations on the directories of the distributed file system which can disrupt the business process of that project.

Referring to block 426 of FIG. 4, in the event where the decision manager module 128 determines to adjust the space quota limits based on the forecasted storage demands for a particular project's workspace or directory 105, the decision manager module 126 will notify the content delivery system 108, specifically emailer module 142 and messenger module 144 about the event. In turn, these modules will 142 and 144 notify the client device 110 (e.g. the platform administrator) and/or the workspace owners, such as one or more user groups 154 owning the affected workspace.

FIG. 5 is yet another example flowchart showing operations 500 implemented by the environment 100, including the disk usage monitoring module 120, the scheduler 132, the decision manager module 126, in conjunction with the trend and behaviour module 126 and the coordinator and optimizer module 130, in accordance to one or more embodiments. At block 502, the scheduler 132 triggers a new disk usage scan of all of the project storage directories 105 and indicates scan completed at block 504. If the space quota adjustment event is triggered by the trends and behaviour module 126 for one or more directories 105 (e.g. based on any one or more of the following factors: the forecasted rate of change of usage and/or rate of change of moving average for the usage shown at block 506; the disk usage amount surpassing a pre-defined upper limit or threshold at block 508; and the disk usage amount for the directory appears an upper limit at block 510) then a new space quota limit is calculated by the machine learning engine 124.

Subsequently, at block 514, the coordinator and optimizer module 130 computes a new weight coefficient (also referred to as an aggregated correction coefficient) to be applied to the proposed limit at block 516, e.g. the new space quota limit depending on the current and predicted state of all other distributed file system directories 105 relative to the available storage.

Based on the new space quota limit adjusted by the aggregated correction coefficient, the decision manager module 126 applies, in block 518, the new space quota limit on the affected directory (e.g. 105-1, 105-2, . . . ), and then at block 520, it notifies the emailer module 142 and the messenger module 144 to inform the directory's user group 154 and/or client device 110 about the change.

One feature of the modules of the machine learning engine 124 shown in FIGS. 1A and 1B, is the ability to self-regulate and self-balance the act of dynamically adjusting the quota limits. For example, if the prediction of one particular directory requires the increase of the quota limit, this event has a more reactive aspect. After a number of few more disk usage scans, the sudden increase in the disk usage leading to the automatic adjustment of the quota limit, prove to be no longer necessary. Instead, now the prediction is for a lower quota limit, and the system acts on this prediction and lowers the quota limit for that workspace. Thus, the machine learning engine 124 acts proactively and optimizes not only the quota limit of that particular directory, but by doing so, it frees up this locked resource back to the cluster pool. Because the prediction activity and the action on prediction aspects work both ways, on increasing and decreasing the quota limits, the system as a whole as shown by the environment 100 is self-balancing, self-regulating and self-optimizing.

Referring again to FIG. 5, as shown at block 512, the machine learning engine 124 determines that the disk usage for a particular directory 105 remains unchanged for a period of time. This may be a sign that the either the work on that project and associated workspace or directory 105 has been finished, but the workspace has not been reclaimed or returned back to the cluster, or the project has been abandoned and the allocated disk again remained locked. In this situation, the decision manager module 126 notifies the emailer module 142 and messenger module 144 to inform the respective user group 154 at block 522, allowing the user the possibility to acknowledge or deny the request via a user interface. In case of a positive acknowledgement at block 526, the decision manager module 126 will execute the removal of any applied quota on that particular directory at block 528 and 530, freeing the available space to the whole cluster (e.g. file system 104) and as notified to the respective user group 154 at block 530.

As shown in block 522, a number of messages may be sent to the user group 154, and in case no acknowledgement is received back from the respective user group 154, before an alarm count threshold is triggered at block 524 and the decision manager module 128 removes the applied quota on the affected directory 105 and release the potential locked space back to the cluster.

In at least some aspects, the coordinator and optimizer module 130 may have the role of correlating the findings of the trends and behaviour module 126, across all the workspaces in the project storage directories 105 configured in the cluster, correlating also with the total amount of available storage resources of the cluster, and any action suggested by the trends and behaviour module 126, with the current and forecasted status of all other workspaces (e.g. storage directories 105) of the cluster, before the decision of an action is taken by the decision manager module 126. Conveniently, in this aspect, since the decision to adjust the quota on a particular workspace or directory 105, is not taken independently, based only on the stats and trends of that particular workspace, but in conjunction with the forecasted storage trends, and current status of all workspaces and the cluster itself, the forecasted new space quota limit accurately reflects upcoming demands for the distributed file system 104 as a whole.

In at least some aspects, the value of the computed aggregated correction coefficient as calculated by the coordinator and optimizer module is based upon the total aggregated trend of the space usage of the whole cluster (e.g. distributed file system 104) and it can be interpreted as a prediction factor for the trend and behaviour of the whole cluster provided by the distributed file system 104. Put another way, the aggregated correction coefficient may characterize the total aggregated influence of the current and forecasted trends and behaviours of all the other configured directories (e.g. 105-2 . . . 105-N) on a single directory (e.g. 105-1), as computed by the machine learning engine 124. In yet a further aspect, this aggregated correction coefficient characterizes an adjustment factor, before the decision manager module 128 sets the new space quota limit 33, by adjusting the trend and behavior of each individual directory as computed by the module 126, with this aggregated correction coefficient factor.

The aggregated correction coefficient as applied by the decision manager module 128 to a proposed new space quota limit (e.g. as computed by the trends and behaviour module 126) provides an individual adjustment for a particular directory (e.g. 105-1) and ensures the overall trend and behaviour of the whole cluster (e.g. all of the remaining directories 105-2 . . . 105-N) is taken in consideration, and thereby preferably avoids an unexpected or premature reaching of the quota limits that would otherwise happen if only individual decisions would have been taken.

In one embodiment, the storage size of each workspace associated with each directory (105-1 . . . 105-N) is characterized as a function of time, e.g. $f_1(t)$ and based on the current quota usage (e.g. actual past storage usage data) and rate of change of quota usage (see equation (1) below). The coordinator and optimizer module 130 is configured to track and monitor the expected project demands of each of the directories 105 considered individually and as a whole, and it determines the aggregated correction coefficient (e.g. also referred to as a global coefficient factor for adjustment for adjusting the projected storage amount) as well as the adjustment coefficients for the rate of change of directory usage and the rate of change moving average of the interpolated curve (also referred to as k-factors or weight coefficients).

The coordinator and optimizer module 130 calculates a storage size as a function of time, $f(t)$, for every project in directories 105-1, 105-2, . . . , 105-N. The storage size as a function of time can be approximated as a linear function. An example of computing the storage size $f(t)$ as a function of time for a first directory (e.g. 105-1) is shown in equation (1).

$$f_1(t) = A_1 t + B_1 \qquad (1)$$

Where $$A_1 = k_1 \frac{dU_1}{dt} + k_2 \frac{dU_{1avg}}{dt},$$

and $k_1+k_2=1$. $k_1$ and $k_2$ are the adjustment coefficients for the rate of change curves (e.g. to locate a median curve been the curves calculated for $$\frac{dU_1}{dt}, \frac{dU_{1avg}}{dt}\Big), \text{ and } \frac{dU_1}{dt}, \frac{dU_{1avg}}{dt}$$

are respectively the first derivative of the interpolated curve and the first derivative of the moving average of the interpolated curve of the first directory 105-1. The storage size $f(t)$ curve may be representative of the adjusted curve 34 shown in FIG. 6 and FIG. 7.

In one example, the adjustment coefficients, $k_1$ and $k_2$, may each be set to a value of 0.5. The decision manager module 128 may also be configured to adjust the adjustment coefficients further depending on the volatility of the first directory.

For example, the decision manager module 128 may set $k_1$ to a value close to 1 when there is a volatility in the storage demand of the project whereas $k_2$ may be set close to 1 when there is indication of stability and steadiness in the storage operation of the first directory.

As mentioned previously, the system settings data 118 stores each project's storage quota (for example shown as space quota limit 27 n FIG. 6 and FIG. 7), e.g. Q. The storage quota of a project associated with the first directory 105-1, $Q_{1x}$ can be defined by the elements in equation (2). Project 105-1 is used as an example, but it is understood that the same equation may be applicable to all remaining directories (e.g. 105-2, . . . 105-N). The decision manager module 128 is configured to communicate with at least the modules 126 and 130 to determine and adjust the maximum storage (e.g. to the new space quota limit 33 shown in FIG. 6 and FIG. 7) for each directory 105-1, . . . 105-N to provide same to the disk quota setting module 122 and communicate with data repository 106.

$$Q_1 = g_1(T_{D1}) = G_{ka}\left(k_1\frac{dU_1}{dt} + k_2\frac{dU_{1avg}}{dt}\right)T_{D1} + B_1 \quad (2)$$

Where $G_{ka}$ is the global adjustment coefficient (also referred to as the aggregate correction coefficient) provided by the coordinator and optimizer module 130 used to adjust a predicted space quota limit to define the new space quota limit. Also, $T_{D1}$ is the project timeframe (e.g. expected future time 30 shown in FIG. 6 and FIG. 7) of the directory 105-1. Put another way, the global adjustment coefficient $G_{ka}$ (also referred to herein as the aggregate correction coefficient) represents an overall correction factor that is applied to predicted or forecasted storage usage values of each defined project storage directory, as computed by the machine learning engine 124, to adjust the predicted or forecasted values based on the overall and cumulative behaviour of the sum of all the whole cluster (e.g. all of the directories 105). Notably, this global adjustment coefficient $G_{ka}$ (also referred to as the aggregate coefficient) is continuously computed at each iteration of the machine learning engine 124. For example, at a first iteration, the aggregate coefficient may be pre-defined but as described herein, the aggregate coefficient is computed and automatically adjusted as the machine learning engine 124 dynamically learns for subsequent iterations of the machine learning engine 124.

However, Q is frequently monitored and calculated through the disk usage monitoring module 120, which is triggered by instructions from the scheduler 132; therefore, equation (2) is updated to keep a record of time as shown in equation (3).

$$Q_{1x} = g_1(T_{D1x}) = G_{ka}\left(k_1\frac{dU_1}{dt} + k_2\frac{dU_{1avg}}{dt}\right)T_{D1x} + B_1 \quad (3)$$

The coordinator and optimizer module 130 communicating with modules 126 and 128 computes $Q_{1x}$, which represents the predicted storage quota of directory 105-1. The value of $Q_{1x}$ can be greater than $Q_{1x}$ equal to $Q_1$ or less than $Q_{1x}$ where $Q_1$ is the storage quota allocated to the workspace in directory 105-1 and stored in system settings data 118.

Decision manager module 128 compares the value of $Q_{1x}$ to the existing storage quota $Q_1$ (also referred to as space quota limit 27). If $Q_{1x}$ is equal to $Q_{1x}$ the decision manager module 126 takes no action. However, if $Q_{1x}$ is smaller than $Q_{1x}$ it reduces the storage quota of $Q_1$ and releases the freed up quota to the cluster pool. When $Q_{1x}$ is greater than $Q_{1x}$ the decision manager module 128 allocates more storage quota to Q1 from the free cluster pool (e.g. allocated to all directories 105 as a whole). The decision manager module 128 also communicates and updates the system settings data 118 accordingly via disk quota setting module 122 when there are changes.

As a result of the aforementioned quota adjustment, in at least one aspect, the distributed file system 104 is modelled in the trends and behaviour module 126 as a polymorphic matrix referred to as the system matrix and represented as:

$$\begin{bmatrix} T_{D1x}, Q_{1x}, g_1(T_{D1x}) = G_{ka}\left(k_{11}\frac{dU_1}{dt} + k_{12}\frac{dU_{1avg}}{dt}\right)T_{D1x} + B_1 \\ T_{D2x}, Q_{2x}, g_2(T_{D2x}) = G_{ka}\left(k_{21}\frac{dU_2}{dt} + k_{22}\frac{dU_{2avg}}{dt}\right)T_{D2x} + B_2 \\ T_{D3x}, Q_{3x}, g_3(T_{D3x}) = G_{ka}\left(k_1\frac{dU_3}{dt} + k_2\frac{dU_{3avg}}{dt}\right)T_{D3x} + B_3 \\ \ldots \\ T_{Dnx}, Q_{nx}, g_1(T_{Dnx}) = G_{ka}\left(k_1\frac{dU_n}{dt} + k_2\frac{dU_{navg}}{dt}\right)T_{Dnx} + B_n \end{bmatrix}$$

Throughout the operation of updating quotas, the machine learning engine 124 through communication with the disk usage monitoring module 120 calculates the free storage space of the system using equation (3) at any point in time the disk usage monitoring module is executed.

$$S_x = S_{total} - S_{margin} - (Q_{1x} + Q_{2x} + \ldots + Q_{nx}) \quad (3)$$

Where $S_{total}$ is the total storage capacity of the system 104, $S_{margin}$ is the minimum amount of storage for the system to operate properly, and $Q_{1x}+Q_{2x}+\ldots+Q_{nx}$ is the sum of all storage quotas of all projects 105-1, 105-2, . . . 105-N.

Since each project has its own project timeframe (e.g. expected future time 30 shown in FIG. 6 and FIG. 7), the machine learning engine 124 coupled with the decision manager module 128, may be configured in at least one aspect, to sort project timeframes from the most immediate to the longest and represents them as an array referred to as sorted array of:

$$T_D = [T_{Dix}, T_{Djx}, T_{Dkx}, \ldots, T_{Drx}, T_{Dsx}].$$

The trends and behaviour module 126 evaluates, at each trigger of disk usage monitoring module 120, the system matrix based on the most immediate timeframe $T_{Dix}$ for every function in the system matrix. There is a function for every project in the system. The machine learning engine 124 predicts not only the necessary quota allocation of project i, corresponding to $T_{Dix}$, but it needs to correlate the impact of all predictions on the whole system and to adjust the actual prediction for each individual project, based on the overall dynamics of the system 100 as a whole.

Therefore, the decision manager module 128 considers the following system matrix when updating the storage quota of the projects.

$$\begin{bmatrix} T_{D1x}, Q_{1x}, g_1(T_{D1x}) = G_{ka}\left(k_{11}\dfrac{dU_1}{dt}+k_{12}\dfrac{dU_{1avg}}{dt}\right)T_{Dix}+B_1 \\ T_{D2x}, Q_{2x}, g_2(T_{D2x}) = G_{ka}\left(k_{21}\dfrac{dU_2}{dt}+k_{22}\dfrac{dU_{2avg}}{dt}\right)T_{Dix}+B_2 \\ T_{D3x}, Q_{3x}, g_3(T_{D3x}) = G_{ka}\left(k_1\dfrac{dU_3}{dt}+k_2\dfrac{dU_{3avg}}{dt}\right)T_{Dix}+B_3 \\ \ldots \\ T_{Dnx}, Q_{nx}, g_1(T_{Dnx}) = G_{ka}\left(k_1\dfrac{dU_n}{dt}+k_2\dfrac{dU_{navg}}{dt}\right)T_{Dix}+B_n \end{bmatrix}$$

The workspace of project i will be dropped at the end of the lifecycle $T_{Di}$, and all its allocated storage $Q_i$ is released back to the cluster pool. The released space is not computed anymore, and its parameters are removed from the system matrix and from the sorted array of $T_D$.

In at least one aspect, once the decision manager module 128 issues instructions to release quota of project i to the cluster pool, the disk usage module 120 communicates with disk quota setting module 122 to update the available distributed file system 104 storage. Subsequently, in said aspects the trends and behaviour module 126 computes the system matrix using the next immediate timeframe, $T_{Dix}$, as presented in the following matrix.

$$\begin{bmatrix} T_{D1x}, Q_{1x}, g_1(T_{D1x}) = G_{ka}\left(k_{11}\dfrac{dU_1}{dt}+k_{12}\dfrac{dU_{1avg}}{dt}\right)T_{Djx}+B_1 \\ T_{D2x}, Q_{2x}, g_2(T_{D2x}) = G_{ka}\left(k_{21}\dfrac{dU_2}{dt}+k_{22}\dfrac{dU_{2avg}}{dt}\right)T_{Djx}+B_2 \\ T_{D3x}, Q_{3x}, g_3(T_{D3x}) = G_{ka}\left(k_1\dfrac{dU_3}{dt}+k_2\dfrac{dU_{3avg}}{dt}\right)T_{Djx}+B_3 \\ \ldots \\ T_{Dnx}, Q_{nx}, g_1(T_{Dnx}) = G_{ka}\left(k_1\dfrac{dU_n}{dt}+k_2\dfrac{dU_{navg}}{dt}\right)T_{Djx}+B_n \end{bmatrix}$$

It is understood that the results of the function $g_n(T_{Dx})$ could be very different at each iteration of the system matrix at any given time.

The coordinator and optimizer module 130 also computes the storage quota at cluster level and is responsible for calculating the global coefficient of adjustment $G_{ka}$ (also referred to as the aggregated correction coefficient) used in computing storage quota in equation (3) above. The coordinator and optimizer module 130 first calculates the total storage allocation, $Q_{total}$, at the cluster level, at a particular point in time, $t_x$, whenever the disk usage module 120 is triggered by the scheduler 132. $Q_{total}$ is calculated as in equation (4).

$$Q_{total}(tx)=((Q_{1x}+Q_{2x}+\ldots+Q_{nx}) \tag{4}$$

The coordinator and optimizer module 130 also calculates the total storage usage, $S_{total}$, at the cluster level at any particular point in time, $t_x$, as in equation (5).

$$S_{total}(tx)=(B_{1x}+B_{2x}+\ldots+B_{nx}) \tag{5}$$

As a result, the maximum allocation possible in the cluster, at any point in time is $Q_{free\_max}(tx)$ and is calculated as in equation (6).

$$Q_{free\_max}(tx)=S_{total}-S_{margin} \tag{6}$$

Afterwards, the coordinator and optimizer module 130 computes the storage quota predication function at the cluster level using the weight coefficients, w, as in equation (7), knowing that $Q_{predicted}(T_{Djx})=F_{cluster}(T_{Djx})$.

$$F_{cluster}(T_{Djx})=(w_1A_1+w_2A_2+\ldots+w_nA_n)T_{Djx}+S_{total}(T_{Djx}) \tag{7}$$

Where $w_r$ is the weight coefficient of the rate of change for a particular workspace r and is calculated using allocated storage quotas as in equation (8).

$$w_r=\dfrac{Q_r}{Q_1+Q_2+\ldots+Q_n} \tag{8}$$

In another embodiment, the coordinator and optimization module 130 calculates $w_r$ using actual storage usage as in equation (9).

$$w_r=\dfrac{B_r}{B_1+B_2+\ldots+B_n} \tag{9}$$

When the coordinator and optimizer module 130 finds $Q_{predicted}(T_{Djx}) \le Q_{free\_max}(T_{Djx})$, it decides that no global coefficient of adjustment is necessary and assigns a value of 1 to $G_{ka}$. Otherwise, the global coefficient of adjustment needs to compensate $A_r$ of each workspace of directory 105-r such that:

$$G_{ka}(w_1A_1+w_2A_2+\ldots+w_nA_n)T_{Djx}+S_{total\_usage}(T_{Djx})=Q_{free\_max} \tag{10}$$

Based on equation (10), the coordinator and optimizer module 130 calculates the global coefficient of adjustment as in equation (11).

$$G_{ka}=\dfrac{Q_{free\_max}-S_{total\_usage}(T_{Djx})}{(w_1A_1+w_2A_2+\ldots+w_nA_n)T_{Djx}} \tag{11}$$

In another embodiment, the coordinator and optimizer module 130 calculates $G_{ka}$ by monitoring the overall dynamics of the cluster $A_{cluster}$ by monitoring the Hadoop HDFS root as in equation (12). The HDFS root can be configured just as any other workspaces in directories 105-1, 105-2, ..., 105-N.

$$F_{cluster}(T_{Djx})=A_{cluster}T_{Djx}+S_{total\_usage}(T_{Djx}) \tag{12}$$

Similar to equation (10), when $Q_{predicted(T_{Djx})}>Q_{free\_max(T_{Djx})}$ the storage quota equation of the cluster level is modeled as in equation (13).

$$G_{ka}A_{cluster}T_{Djx}+S_{total\_usage}(T_{Djx})=Q_{free\_max} \tag{13}$$

The coordinator and optimizer module 130 calculates $G_{ka}$ as in equation (14).

$$G_{ka} = \frac{Q_{free\_max} - S_{total\_usage}(T_{Djx})}{(w_1 A_1 + w_2 A_2 + \ldots + w_n A_n) T_{Djx}} \quad (14)$$

In one aspect, the aggregated correction coefficient $G_{ka}$ (also referred to as the global coefficient of adjustment) would be further adjusted by a workspace or project directory (e.g. 105) specific correction factor based on the dynamics of each workspace including for example, the volatility of the storage specific to each workspace or project directory (e.g. 105).

The coordinator and optimizer module 130 can also adjust the global coefficient of adjustment (also referred to as the aggregate correction coefficient) based on the determined volatility of the workspace of each project 105, and/or by running regression scans on the storage usage history of each workspace by communicating with data repository 106.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow. Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A computer implemented method for automatically managing storage resources of a distributed file system, the method comprising:

obtaining actual past storage usage data of a first directory from a plurality of directories of the distributed file system, the actual past storage usage data representative of storage usage at the first directory over a defined time period extending from a past time to a current time;

detecting a space quota limit for the first directory, the space quota limit for providing a maximum limit on total storage for the first directory, the space quota limit associated with a pre-defined expected future time for providing a maximum amount of time for expecting use of resources of the first directory;

determining, in real-time, based on the actual past storage data, projected storage usage data of the first directory, by inputting the actual past storage data into a trained machine learning model for determining a storage usage trend of the first directory, the projected storage usage data representing a future storage usage for the first directory over a future time period from the current time;

wherein determining the projected storage usage data of the first directory further comprises using the actual past storage usage data to:

define an interpolated curve representing a function of the actual past storage usage data extending from the current time to the past time; and determine the projected storage usage data of the first directory as a function of a first derivative of the interpolated curve reflecting a rate of change of the projected usage over time and a first derivative of a moving average of the interpolated curve;

obtaining an aggregated correction coefficient providing an indication of aggregated projected storage usage needs of all other remaining distributed file system directories from the plurality of directories, relative to the projected storage usage data of the first directory, by characterizing a total aggregate influence of current and forecasted trends and behaviours of said all other distributed file system directories from the plurality of directories on a single directory from the directories comprising the first directory;

in response to determining an expected value of a projected storage usage data at the expected future time is inconsistent with the space quota limit, adjusting the space quota limit to a new quota limit for the first directory based on the expected value weighted by the aggregated correction coefficient; and applying the new quota limit to the first directory from the current time.

2. The method of claim 1, wherein determining the new quota limit further comprises increasing the space quota limit to the new quota limit when the space quota limit is insufficient based on the projected storage usage data indicating that the space quota limit will be reached prior to the expected future time.

3. The method of claim 1, further comprising decreasing the space quota limit to the new quota limit when the projected storage usage data at the expected future time has a value below the space quota limit by at least a pre-defined amount.

4. The method of claim 1, wherein the weighting by the aggregated coefficient is further based upon an obtained value for total disk storage availability of a cluster defined by the plurality of directories of the distributed file system, the total disk storage availability indicating total amount of disk storage currently available for use by the plurality of directories and indicative of degree of possible change between the space quota limit and the new quota limit.

5. The method of claim 4, wherein the aggregated correction coefficient is further based upon:
projecting respective storage needs of each of the plurality of directories using the trained machine learning model to determine a respective projected storage usage data for each of said directories and thereby a respective expected storage usage amount at the expected future time; and,
determining the aggregated correction coefficient for each of the plurality of directories indicating a ratio of possible increase or decrease of respective space quota limit for each of the directories based upon the respective expected storage usage amount and the total disk storage availability for all of the plurality of directories.

6. The method of claim 1, wherein the space quota limit and the new quota limit provide different values for restricting a maximum number of bytes of disk space allowed to be used by files under a tree rooted at the first directory for respectively the current time and the expected future time, further to said adjusting.

7. The method of claim 1, wherein prior to determining the projected storage usage data of the first directory:
training a machine learning model, to provide the trained machine learning model, using space usage training data representative of space usage of the first directory and each of the remaining other directories pre-defined as being related to the first directory.

8. The method of claim 1, wherein:
the first derivative of the moving average of the interpolated curve is calculated to define a second slope indicating an average rate of change of the projected storage usage over time.

9. The method of claim 8, wherein the calculated first derivative of the interpolated curve is used to project a first expected storage usage amount at the expected future time in the future time period and the calculated first derivative of the moving average is used to project a second expected storage usage amount at the expected future time in the future time period, and the new quota limit is an average of the first and the second expected storage usage amount weighted by the aggregated correction coefficient.

10. The method of claim 8, wherein the new quota limit is calculated as $Q_{1x}$ such that:

$$Q_{1x} = G_{ka}\left(k_1 \frac{dU_1}{dt} + k_2 \frac{dU_{1avg}}{dt}\right)T_{D1x} + B_1$$

and $k_1 + k_2 = 1$,
wherein, $G_{ka}$ is the aggregated correction coefficient, $k_1$ and $k_2$ are respectively pre-defined adjustment coefficients for the first derivative of the interpolated curve $$\frac{dU_1}{dt},$$

and the first derivative of the moving average of the interpolated curve $$\frac{dU_{1avg}}{dt},$$

$T_{D1x}$ is the expected future time and $B_1$ is a y-intercept point for storage usage providing a value of actual storage usage of the first directory at the current time.

11. The method of claim 1, wherein prior to obtaining actual past storage usage data receiving a trigger from a scheduler, indicating a scheduled scan of each of the plurality of directories for respective actual storage usage up to the current time used for obtaining the actual past storage usage data.

12. The method of claim 1, wherein the trained machine learning model comprises multiple machine trained machine learning models, each one configured for one of the directories of the plurality of directories.

13. The method of claim 1, further comprising repeating the method of claim 1 for each additional directory of the plurality of directories to result in determining a corresponding new quota limit for said each additional directory and thereby applying the corresponding new quota limit for said each additional directory.

14. A computer implemented method for creating a predictive machine learning engine for predicting data storage usage for managing storage resources of a distributed file system, the method comprising the steps of:
determining trends and behaviour in received electronic past storage usage data for each directory of a plurality of directories of the distributed file system, the data extending from a current time to a past time using a first machine learning algorithm;
obtaining a space quota limit for each said directory for imposing a maximum limit on total storage used by files in each said directory, the space quota limit having an associated expected future time such that expected use of the storage resources of each said directory is limited to prior to the expected future time;
using the determined trends and behaviour to predict a projected storage usage data for each said directory extending for a future time period from the current time to a future time, including an expected storage usage amount for each said directory at the expected future time;
wherein determining the projected storage usage data for each said directory further comprises:
defining an interpolated curve representing a function of the past storage usage data extending from the current time to the past time; and
determining the projected storage usage data for each said directory as a function of a first derivative of the interpolated curve reflecting a rate of change of the projected storage usage over time and a first derivative of a moving average of the interpolated curve;
comparing the expected storage usage amount to the space quota limit for each said directory to determine whether a projected need for increase or decrease of the space quota limit exists;
when a pre-defined difference exists in the comparison, then:
calculating a correction coefficient for each said directory which determines a weighting for the projected need based on aggregated projected need for each said directory relative to a total disk storage availability of the plurality of directories, by characterizing a total aggregate influence of the current and forecasted trends and behaviours of the plurality of directories on each single directory from the directories;

adjusting the space quota limit to a new space quota limit for each said directory to reduce the pre-defined difference based on the weighting applied to the expected storage usage amount; and, generating the prediction machine learning engine for use in applying the new space quota limit to each said directory in the distributed file system having the pre-defined difference indicating the projected need for the increase or decrease.

15. A computer device for automatically managing storage resources of a distributed file system, the device comprising:

a storage device storing instructions;

a communications interface;

at least one processor in communication with the storage device and the communications interface, the at least one processor configured to execute the instructions for:

obtaining actual past storage usage data of a first directory from a plurality of directories of the distributed file system across the communications interface, the actual past storage usage data representative of storage usage at the first directory over a defined time period extending from a past time to a current time;

detecting a space quota limit for the first directory, the space quota limit for providing a maximum limit on total storage for the first directory, the space quota limit associated with a pre-defined expected future time for providing a maximum amount of time for expecting use of the resources of the first directory;

determining, in real-time, based on the actual past storage data, projected storage usage data of the first directory, by inputting the actual past storage data into a trained machine learning model for determining a storage usage trend of the first directory, a projected storage usage data representing a future storage usage for the first directory over a future time period from the current time;

wherein determining the projected storage usage data of the first directory comprises using the actual past storage usage data to:

define an interpolated curve representing a function of the actual past storage usage data extending from the current time to the past time; and determine the projected storage usage data of the first directory as a function of a first derivative of the interpolated curve reflecting a rate of change of the projected usage over time and a first derivative of a moving average of the interpolated curve;

obtaining an aggregated correction coefficient providing an indication of aggregated projected storage usage needs of all other remaining distributed file system directories from the plurality of directories, relative to the projected storage usage data of the first directory, by characterizing a total aggregate influence of the current and forecasted trends and behaviours of said all other distributed file system directories from the plurality of directories on a single directory from the directories comprising the first directory;

in response to determining an expected value of a projected storage usage data at the expected future time is inconsistent with the space quota limit, adjusting the space quota limit to a new quota limit for the first directory based on the expected value weighted by the aggregated correction coefficient; and applying the new quota limit to the first directory from the current time.

16. The computer device of claim 15, wherein the at least one processor is further configured for: determining the new quota limit further comprises increasing the space quota limit to the new quota limit when the space quota limit is insufficient based on the projected storage usage data indicating that the space quota limit will be reached prior to the expected future time.

17. The computer device of claim 15, wherein the at least one processor is further configured for: decreasing the space quota limit to the new quota limit when the projected storage usage data at the expected future time has a value below the space quota limit by at least a pre-defined amount.

18. The computer device of claim 15, wherein the at least one processor is further configured for: weighting by the aggregated correction coefficient further based upon an obtained value for total disk storage availability of a cluster defined by the plurality of directories of the distributed file system, the total disk storage availability indicating total amount of disk storage currently available for use by the plurality of directories and indicative of degree of possible change between the space quota limit and the new quota limit.

19. The computer device of claim 18, wherein the aggregated correction coefficient is further based upon:

projecting respective storage needs of each of the plurality of directories using the trained machine learning model to determine the respective projected storage usage data for each of said directories and thereby a respective expected storage usage amount at the expected future time; and, determining the aggregated correction coefficient for each of the plurality of directories indicating a ratio of possible increase or decrease of respective space quota limit for each of the directories based upon the respective expected storage usage amount and the total disk storage availability for all of the plurality of directories.

20. The computer device of claim 15, wherein the space quota limit and the new quota limit provide different values for restricting a maximum number of bytes of disk space allowed to be used by files under a tree rooted at the first directory for respectively the current time and the expected future time, further to said adjusting.

21. The computer device of claim 15, wherein prior to determining the projected storage usage data of the first directory:

training a machine learning model, to provide the trained machine learning model, using space usage training data representative of space usage of the first directory and each of the remaining other directories pre-defined as being related to the first directory.

22. The computer device of claim 15, wherein:

the first derivative of the interpolated curve is calculated via the computer device;

the first derivative of the moving average of the interpolated curve is calculated via the computer device for defining a second slope indicating an average rate of change of the projected storage usage over time.

23. The computer device of claim 22, wherein the new quota limit is calculated as $Q_{1x}$ such that:

$$Q_{1x} = G_{ka}\left(k_1 \frac{dU_1}{dt} + k_2 \frac{dU_{1avg}}{dt}\right)T_{D1x} + B_1$$

and $k_1+k_2=1$ wherein, $G_{ka}$ is the aggregated correction coefficient, $k_1$ and $k_2$ are respectively pre-defined adjustment coefficients for the first derivative of the interpolated curve $$\frac{dU_1}{dt},$$

and the first derivative of the moving average of the interpolated curve $$\frac{dU_{1avg}}{dt},$$

$T_{D1x}$ is the expected future time and $B_1$ is a y-intercept point for storage usage providing a value of actual storage usage of the first directory at the current time.

24. The computer device of claim 22, wherein the calculated first derivative of the interpolated curve is used to project a first expected storage usage amount at the expected future time in the future time period and the calculated first derivative of the moving average is used to project a second expected storage usage amount at the expected future time in the future time period, and the new quota limit is an average of the first and the second expected storage usage amount weighted by the aggregated correction coefficient.

25. The computer device of claim 24, wherein prior to obtaining actual past storage usage data receiving a trigger from a scheduler, indicating a scheduled scan of each of the plurality of directories for respective actual storage usage up to the current time used for obtaining the actual past storage usage data.

26. The computer device of claim 15, wherein the trained machine learning model comprises multiple machine trained machine learning models, each one configured for one of the directories of the plurality of directories.

27. A non-transitory computer readable medium having stored thereon computer program code configured, when executed by one or more processors, to cause the one or more processors to perform a method for automatically managing storage resources of a distributed file system, the method comprising:

obtaining, in real-time, actual past storage usage data of a first directory from a plurality of directories of the distributed file system, the actual past storage usage data representative of storage usage at the first directory over a defined time period extending from a past time to a current time;

detecting a space quota limit for the first directory, the space quota limit for providing a maximum limit on total storage used by the first directory, the space quota limit associated with a pre-defined expected future time for providing a maximum amount of time for expecting use of the resources of the first directory;

determining, in real-time, based on the actual past storage data, projected storage usage data of the first directory, by inputting the actual past storage data into a trained machine learning model for determining a storage usage trend of the first directory, the projected storage usage data representing a future storage usage for the first directory over a future time period from the current time;

wherein determining projected storage usage data of the first directory comprises using the actual past storage usage data to:
define an interpolated curve representing a function of the actual past storage usage data extending from the current time to the past time; and
determine the projected storage usage data of the first directory as a function of a first derivative of the interpolated curve reflecting a rate of change of the projected usage over time and a first derivative of a moving average of the interpolated curve;

obtaining an aggregated correction coefficient providing an indication of aggregated projected storage usage needs of all other remaining distributed file system directories from the plurality of directories, relative to the projected storage usage data of the first directory, by characterizing a total aggregate influence of the current and forecasted trends and behaviours of said all other distributed file system directories from the plurality of directories on a single directory from the directories comprising the first directory;

in response to determining an expected value of the projected storage usage data at the expected future time is inconsistent with the space quota limit, adjusting the space quota limit to new quota limit for the first directory based on the expected value weighted by the aggregated correction coefficient; and applying the new quota limit to the first directory from the current time.

28. The computer readable medium of claim 27 further comprising: repeating the method steps of claim 27 for each additional directory of the plurality of directories to result in determining a corresponding new quota limit for said each additional directory and applying the corresponding new quota limit for said each additional directory.

* * * * *